(12) United States Patent  
Primm et al.

(10) Patent No.: US 7,456,736 B2  
(45) Date of Patent: Nov. 25, 2008

(54) EXTENSIBLE SENSOR MONITORING, ALERT PROCESSING AND NOTIFICATION SYSTEM AND METHOD

(75) Inventors: Michael Primm, Austin, TX (US); Richard Jefts, Jr., Austin, TX (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

(21) Appl. No.: 11/427,918

(22) Filed: Jun. 30, 2006

(65) Prior Publication Data

US 2006/0238339 A1    Oct. 26, 2006

Related U.S. Application Data

(63) Continuation of application No. 10/823,172, filed on Apr. 13, 2004, now Pat. No. 7,095,321.

(60) Provisional application No. 60/462,852, filed on Apr. 14, 2003.

(51) Int. Cl.  
*G08B 21/00*    (2006.01)

(52) U.S. Cl. .................. 340/540; 340/506; 340/507; 340/3.1

(58) Field of Classification Search ............ 340/506, 340/540, 507, 517, 3.1  
See application file for complete search history.

(56) References Cited

U.S. PATENT DOCUMENTS

| | | | |
|---|---|---|---|
| 3,810,138 A | 5/1974 | Thompson et al | |
| 4,349,879 A | 9/1982 | Peddie et al | |
| 4,521,645 A | 6/1985 | Carroll | |
| 4,568,934 A | 2/1986 | Allgood | |
| 4,636,652 A | 1/1987 | Raes | |
| 4,637,020 A | 1/1987 | Schinabeck | |
| 4,650,347 A | 3/1987 | Shigemura et al | |
| 4,668,939 A | 5/1987 | Kimura et al | |
| 4,718,025 A | 1/1988 | Minor et al | |
| 4,747,041 A | 5/1988 | Engel et al | |

(Continued)

FOREIGN PATENT DOCUMENTS

| | | |
|---|---|---|
| AU | 3855395 A1 | 6/1996 |
| AU | 5601198 A1 | 7/1998 |
| AU | 0016673 A5 | 6/2000 |
| CA | 2300053 AA | 2/1999 |
| CA | 2312075 AA | 6/1999 |

(Continued)

OTHER PUBLICATIONS

Axis Communications, "Axis 2400/2401 Administration Manual Version 1.1", www.axis.com/techsup/cam_2400/index.htm, version 1.1xx, part No. 16741, pp. 1-78, Jul. 1999.

Fossum, E.R., "CMOS Image Sensors: Electronic Camera-On-Chip", IEEE Transactions on Electron Devices, vol. 44, iss. 10, pp. 1689-1698, Oct. 1997.

(Continued)

*Primary Examiner*—Daryl C Pope  
(74) *Attorney, Agent, or Firm*—Lowrie, Lando & Anastasi, LLP

(57) ABSTRACT

In a particular embodiment, the disclosure is directed to a system including a data management system configured to receive sensor data associated with a sensor, a monitoring system coupled to the data management system, and an alert handling system responsive to the data management system and configured to access an alert profile associated with an error object provided by the monitoring system. The monitoring system is configured to provide the error object in response to a monitoring algorithm associated with the sensor data received by the data management system.

27 Claims, 16 Drawing Sheets

U.S. PATENT DOCUMENTS

| | | | |
|---|---|---|---|
| 4,751,648 A | 6/1988 | Sears, III et al | |
| 4,816,208 A | 3/1989 | Woods et al | |
| 4,823,290 A | 4/1989 | Fasack et al | |
| 4,964,065 A | 10/1990 | Hicks et al | |
| 5,043,807 A | 8/1991 | Rabii | |
| 5,061,916 A | 10/1991 | French et al | |
| 5,086,385 A | 2/1992 | Launey et al | |
| 5,097,328 A | 3/1992 | Boyette | |
| 5,109,278 A | 4/1992 | Erickson et al | |
| 5,153,837 A | 10/1992 | Shaffer et al | |
| 5,157,732 A | 10/1992 | Ishii et al | |
| 5,189,394 A | 2/1993 | Walter et al | |
| 5,216,623 A | 6/1993 | Barrett et al | |
| 5,220,522 A | 6/1993 | Wilson et al | |
| 5,225,997 A | 7/1993 | Lederer et al | |
| 5,229,850 A | 7/1993 | Toyoshima | |
| 5,262,758 A | 11/1993 | Nam et al | |
| 5,289,275 A | 2/1994 | Ishii et al | |
| 5,367,670 A | 11/1994 | Ward et al | |
| 5,382,943 A | 1/1995 | Tanaka | |
| 5,395,042 A | 3/1995 | Riley et al | |
| 5,400,246 A * | 3/1995 | Wilson et al. | 700/17 |
| 5,404,136 A | 4/1995 | Marsden | |
| 5,475,364 A | 12/1995 | Kenet | |
| 5,488,430 A | 1/1996 | Hong | |
| 5,491,511 A | 2/1996 | Odle | |
| 5,508,941 A | 4/1996 | Leplingard et al | |
| 5,528,507 A | 6/1996 | McNamara et al | |
| 5,548,659 A | 8/1996 | Okamoto | |
| 5,553,609 A | 9/1996 | Chen et al | |
| 5,561,476 A | 10/1996 | Kershaw et al | |
| 5,566,339 A | 10/1996 | Perholtz et al | |
| 5,572,195 A | 11/1996 | Heller et al | |
| 5,581,478 A | 12/1996 | Cruse et al | |
| 5,586,202 A | 12/1996 | Ohki et al | |
| 5,588,067 A | 12/1996 | Peterson et al | |
| 5,589,764 A | 12/1996 | Lee | |
| 5,602,585 A | 2/1997 | Dickinson et al | |
| 5,621,662 A | 4/1997 | Humphries et al | |
| 5,634,002 A | 5/1997 | Polk et al | |
| 5,659,470 A | 8/1997 | Goska et al | |
| 5,664,202 A | 9/1997 | Chen et al | |
| 5,715,160 A | 2/1998 | Plotke | |
| 5,731,832 A | 3/1998 | Ng | |
| 5,732,074 A | 3/1998 | Spaur et al | |
| 5,742,762 A | 4/1998 | Scholl et al | |
| RE35,793 E | 5/1998 | Halpern | |
| 5,768,430 A | 6/1998 | Takashima et al | |
| 5,798,798 A | 8/1998 | Rector et al | |
| 5,805,458 A | 9/1998 | McNamara et al | |
| 5,812,055 A | 9/1998 | Candy et al | |
| 5,818,725 A | 10/1998 | McNamara et al | |
| 5,822,302 A | 10/1998 | Landry, Jr. et al | |
| 5,829,130 A | 11/1998 | Miller | |
| 5,892,440 A | 4/1999 | Bryan | |
| 5,905,867 A | 5/1999 | Giorgio et al | |
| 5,926,210 A | 7/1999 | Hackett et al | |
| 5,937,092 A | 8/1999 | Wootton et al | |
| 5,937,097 A | 8/1999 | Lennon | |
| 5,949,974 A | 9/1999 | Ewing et al | |
| 5,955,946 A | 9/1999 | Beheshti et al | |
| 5,963,457 A | 10/1999 | Kanoi et al | |
| 5,968,116 A | 10/1999 | Day, II et al | |
| 5,974,237 A | 10/1999 | Shurmer et al | |
| 5,978,594 A | 11/1999 | Bonnell et al | |
| 5,978,912 A | 11/1999 | Rakavy et al | |
| 5,987,614 A | 11/1999 | Mitchell et al | |
| 5,991,885 A | 11/1999 | Chang et al | |
| 6,001,065 A | 12/1999 | DeVito | |
| 6,052,750 A | 4/2000 | Lea | |
| 6,055,480 A | 4/2000 | Nevo et al | |
| 6,057,834 A | 5/2000 | Pickover | |
| 6,058,434 A | 5/2000 | Wilt et al | |
| 6,078,253 A | 6/2000 | Fowler | |
| 6,081,606 A | 6/2000 | Hansen et al | |
| 6,085,243 A | 7/2000 | Fletcher et al | |
| 6,088,816 A | 7/2000 | Nouri et al | |
| 6,094,676 A | 7/2000 | Nolet et al | |
| 6,100,806 A | 8/2000 | Gaukel | |
| 6,104,755 A | 8/2000 | Ohara | |
| 6,105,061 A | 8/2000 | Nakai | |
| 6,108,782 A | 8/2000 | Fletcher et al | |
| 6,112,235 A | 8/2000 | Spofford | |
| 6,115,468 A | 9/2000 | De Nicolo | |
| 6,122,603 A | 9/2000 | Budike, Jr. | |
| 6,122,639 A | 9/2000 | Babu et al | |
| 6,125,145 A | 9/2000 | Koyanagi et al | |
| 6,138,078 A | 10/2000 | Canada et al | |
| 6,138,249 A | 10/2000 | Nolet | |
| 6,139,177 A | 10/2000 | Venkatraman et al | |
| 6,144,770 A | 11/2000 | Lennon | |
| 6,148,262 A | 11/2000 | Fry | |
| 6,157,943 A | 12/2000 | Meyer | |
| 6,160,584 A | 12/2000 | Yanagita | |
| 6,160,926 A | 12/2000 | Dow et al | |
| 6,167,406 A | 12/2000 | Hoskins et al | |
| 6,170,007 B1 | 1/2001 | Venkatraman et al | |
| 6,173,323 B1 | 1/2001 | Moghe | |
| 6,175,866 B1 | 1/2001 | Holloway et al | |
| 6,175,927 B1 | 1/2001 | Cromer et al | |
| 6,177,884 B1 | 1/2001 | Hunt et al | |
| 6,182,094 B1 | 1/2001 | Humpleman et al | |
| 6,182,157 B1 | 1/2001 | Schlener et al | |
| 6,189,109 B1 | 2/2001 | Sheikh et al | |
| 6,195,018 B1 | 2/2001 | Ragle et al | |
| 6,208,261 B1 | 3/2001 | Olstead | |
| 6,208,345 B1 | 3/2001 | Sheard et al | |
| 6,215,404 B1 | 4/2001 | Morales | |
| 6,216,956 B1 | 4/2001 | Ehlers et al | |
| 6,219,628 B1 | 4/2001 | Kodosky et al | |
| 6,236,332 B1 | 4/2001 | Conkright et al | |
| 6,229,429 B1 | 5/2001 | Horon | |
| 6,246,780 B1 | 6/2001 | Sato | |
| 6,259,956 B1 | 7/2001 | Myers et al | |
| 6,266,721 B1 | 7/2001 | Sheikh et al | |
| 6,271,845 B1 | 8/2001 | Richardson | |
| 6,281,790 B1 | 8/2001 | Kimmel et al | |
| 6,282,546 B1 | 8/2001 | Gliechauf et al | |
| 6,298,144 B1 | 10/2001 | Pucker, II et al | |
| 6,304,900 B1 | 10/2001 | Cromer | |
| 6,311,105 B1 | 10/2001 | Budike, Jr. | |
| 6,311,214 B1 | 10/2001 | Rhoads | |
| 6,324,644 B1 | 11/2001 | Rakavy et al | |
| 6,329,792 B1 | 12/2001 | Dunn et al | |
| 6,332,202 B1 | 12/2001 | Sheikh et al | |
| 6,338,094 B1 | 1/2002 | Scott et al | |
| 6,343,320 B1 | 1/2002 | Fairchild et al | |
| 6,360,255 B1 | 3/2002 | McCormack et al | |
| 6,363,421 B2 | 3/2002 | Barker et al | |
| 6,363,422 B1 | 3/2002 | Hunter et al | |
| 6,373,840 B1 | 4/2002 | Chen | |
| 6,374,296 B1 | 4/2002 | Lim et al | |
| 6,375,614 B1 | 4/2002 | Braun et al | |
| 6,381,700 B1 | 4/2002 | Yoshida | |
| 6,389,464 B1 | 5/2002 | Krishnamurthy et al | |
| 6,396,534 B1 | 5/2002 | Mahler et al | |
| 6,400,103 B1 | 6/2002 | Adamson | |
| 6,400,996 B1 | 6/2002 | Hoffberg et al | |
| 6,402,691 B1 | 6/2002 | Peddicord et al | |
| 6,404,348 B1 | 6/2002 | Wilfong | |
| 6,405,216 B1 | 6/2002 | Minnaert et al | |
| 6,449,745 B1 | 9/2002 | Kim et al | |
| 6,477,667 B1 | 11/2002 | Levi et al | |
| 6,496,105 B2 | 12/2002 | Fisher et al | |

| | | | | | | |
|---|---|---|---|---|---|---|
| 6,505,086 | B1 | 1/2003 | Dodd, Jr. et al | GB | 2351205 A | 12/2000 |
| 6,510,350 | B1 | 1/2003 | Steem, III et al | GB | 2344718 B | 1/2001 |
| 6,529,230 | B1 | 3/2003 | Chong | GB | 2355163 A | 4/2001 |
| 6,529,936 | B1 | 3/2003 | Mayo et al | GB | 2359369 A | 8/2001 |
| 6,553,336 | B1 | 4/2003 | Johnson et al | HU | 9300145 U0 | 8/1993 |
| 6,553,418 | B1 | 4/2003 | Collins et al | JP | 3099398 A2 | 4/1991 |
| 6,591,279 | B1 | 7/2003 | Emens et al | JP | 5040889 A2 | 2/1993 |
| 6,611,866 | B1 | 8/2003 | Goldman | JP | 6105376 A2 | 4/1994 |
| 6,640,145 | B2 | 10/2003 | Hoffberg et al | JP | 6119581 A | 4/1994 |
| 6,681,787 | B2 | 1/2004 | Tinsley et al | JP | 8307541 A2 | 11/1996 |
| 6,686,838 | B1 | 2/2004 | Rezvani et al | JP | 11164035 A2 | 6/1999 |
| 6,714,977 | B1 | 3/2004 | Fowler et al | JP | 11219388 A2 | 8/1999 |
| 6,718,364 | B2 | 4/2004 | Connelly et al | JP | 2000092092 A2 | 3/2000 |
| 6,801,940 | B1 | 10/2004 | Moran et al | JP | 2000134606 A2 | 5/2000 |
| 6,829,630 | B1 | 12/2004 | Pajak et al | JP | 2000151606 A2 | 5/2000 |
| 6,990,513 | B2 | 1/2006 | Belfiore et al | JP | 2000209204 A2 | 7/2000 |
| 7,051,096 | B1 | 5/2006 | Krawiec et al | JP | 2000278773 A2 | 10/2000 |
| 7,207,041 | B2 | 4/2007 | Elson et al | TW | 0443058 B | 6/2001 |
| 2001/0005894 | A1 | 6/2001 | Fukui | TW | 0448349 B | 8/2001 |
| 2001/0047213 | A1 | 11/2001 | Sepe, Jr. | WO | 9521506 | 8/1995 |
| 2001/0047410 | A1 | 11/2001 | Defosse | WO | 9615615 | 5/1996 |
| 2001/0052006 | A1 | 12/2001 | Barker et al | WO | 9730879 | 8/1997 |
| 2001/0055965 | A1 | 12/2001 | Delp et al | WO | 9801838 | 1/1998 |
| 2002/0003575 | A1 | 1/2002 | Marchese | WO | 9826541 | 6/1998 |
| 2002/0023258 | A1 | 2/2002 | Elwahab et al | WO | 9908183 | 2/1999 |
| 2002/0041603 | A1 | 4/2002 | Kato | WO | 9915950 | 4/1999 |
| 2002/0043969 | A1 | 4/2002 | Duncan et al | WO | 9927456 | 6/1999 |
| 2002/0071031 | A1 | 6/2002 | Lord et al | WO | 9945445 | 9/1999 |
| 2002/0072868 | A1 | 6/2002 | Bartone et al | WO | 0035177 | 6/2000 |
| 2002/0083378 | A1 | 6/2002 | Nickels | WO | 0039724 | 7/2000 |
| 2002/0124081 | A1 | 9/2002 | Primm et al | WO | 0054557 | 9/2000 |
| 2002/0152298 | A1 | 10/2002 | Kikta et al | WO | 0073866 A1 | 12/2000 |
| 2002/0161885 | A1 | 10/2002 | Childers et al | WO | 0079500 A1 | 12/2000 |
| 2002/0174223 | A1 | 11/2002 | Childers et al | WO | 0101366 A2 | 1/2001 |
| 2003/0098789 | A1 | 5/2003 | Murakami et al | WO | 0108396 | 2/2001 |
| 2003/0204756 | A1 | 10/2003 | Ransom et al | WO | 0127763 A1 | 4/2001 |
| | | | | WO | 0157631 A1 | 8/2001 |
| | | | | WO | 0161665 A2 | 8/2001 |

FOREIGN PATENT DOCUMENTS

| | | | |
|---|---|---|---|
| CA | 2328939 AA | 9/1999 | |
| CN | 87100353 A | 9/1988 | |
| CN | 1294350 A | 5/2001 | |
| EP | 0444997 B1 | 2/1991 | |
| EP | 0591585 B1 | 4/1994 | |
| EP | 0738065 A1 | 3/1996 | |
| EP | 0744112 B1 | 11/1996 | |
| EP | 0859489 A2 | 1/1998 | |
| EP | 0978780 A1 | 8/1998 | |
| EP | 0917034 | 10/1998 | |
| EP | 0917034 B1 | 10/1998 | |
| EP | 0963076 A3 | 5/1999 | |
| EP | 0964551 A1 | 6/1999 | |
| EP | 0927933 A2 | 7/1999 | |
| EP | 0977112 A2 | 7/1999 | |
| EP | 0956680 A1 | 11/1999 | |
| EP | 1014622 A2 | 12/1999 | |
| EP | 0990986 A | 4/2000 | |
| EP | 0992100 | 4/2000 | |
| EP | 1002268 A1 | 5/2000 | |
| EP | 1009130 A | 6/2000 | |
| EP | 1032884 A1 | 9/2000 | |
| EP | 1049291 A2 | 11/2000 | |
| EP | 1115264 A2 | 12/2000 | |
| EP | 1124301 A2 | 12/2000 | |
| EP | 1096724 | 5/2001 | |
| EP | 1142289 A1 | 10/2001 | |
| EP | 1150188 A2 | 10/2001 | |
| EP | 1178628 A2 | 2/2002 | |
| GB | 9826895 A | 1/1999 | |
| GB | 9913682 A | 8/1999 | |
| GB | 2335124 A | 9/1999 | |
| GB | 2343036 A | 4/2000 | |
| GB | 2344718 A | 6/2000 | |

| | | | |
|---|---|---|---|
| WO | 0169405 A1 | 9/2001 | |
| WO | 0169504 | 9/2001 | |
| WO | 0179935 A1 | 10/2001 | |
| WO | 0157477 C1 | 11/2001 | |
| WO | 0182028 A2 | 11/2001 | |
| WO | 0193042 A2 | 12/2001 | |
| WO | 0193508 A1 | 12/2001 | |
| WO | 0197907 A2 | 12/2001 | |
| WO | 0199402 A2 | 12/2001 | |
| WO | 0201877 A1 | 1/2002 | |
| WO | 0211391 A2 | 2/2002 | |
| WO | 0169405 C1 | 3/2002 | |
| WO | 0233980 A2 | 4/2002 | |
| WO | 0237280 A2 | 5/2002 | |
| WO | 0079500 C2 | 6/2002 | |
| WO | 0247044 | 6/2002 | |
| WO | 0247369 A1 | 6/2002 | |
| WO | 0248830 A2 | 6/2002 | |
| WO | 0249285 | 6/2002 | |

OTHER PUBLICATIONS

Axis Communications, "Axis 200+ and 240 Camera Server: User's Guide", www.axis.com/techsup/cam_servers/cam_240/index.htm, pp. 1-38, Jan. 1999.

Axis Communications, "Network Camera Developments Enable Live Web Imaging", Axis 2100 white paper, www.axis.com/products/videos/camera/documentation.htm, pp. 1-12, Nov. 1999.

Sinetica Corp., "Newsletter, Issue One 99", Sinetica, UK, www.sinetica.co.uk, Feb. 1999, XP002160504, 4 pp.

Sinetica Corp., "Netcom TH. Advanced SNMP Agent with Web Browser Support", Sinetica, UK, www.sinetica.co.uk, Apr. 2000, XP002160505, 2 pp.

* cited by examiner

FIG. 4

EXTENSIBLE SENSOR MONITORING, ALERT PROCESSING AND NOTIFICATION SYSTEM AND METHOD

CROSS-REFERENCE TO RELATED APPLICATION(S)

This application claims the benefit, and is a continuation application of prior U.S. application Ser. No. 10/823,172 filed Apr. 13, 2004, now U.S. Pat. No. 7,095,321 entitled "EXTENSIBLE SENSOR MONITORING, ALERT PROCESSING AND NOTIFICATION SYSTEM AND METHOD," which is hereby incorporated by reference in its entirety. The present application also claims priority from U.S. provisional patent application No. 60/462,852 filed Apr. 14, 2003, entitled "EXTENSIBLE SENSOR MONITORING, ALERT PROCESSING AND NOTIFICATION SYSTEM AND METHOD," NAMING INVENTOR Michael Primm and Richard Jefts, Jr., which application is incorporated by reference herein in its entirety.

FIELD OF DISCLOSURE

This disclosure relates generally to a method and system for implementing an extensible sensor monitoring, alert processing and notification system.

BACKGROUND

Embedded monitoring systems, due to their memory and processing limitations, typically implement monitoring and thresholding applications that provide very specific and limited functionality. On typical systems, error monitoring for specific sensors or sensor types is often limited to simple range thresholding (based on comparing the sensor value to a prescribed maximum and/or minimum value). Typically, the thresholding capabilities for any given sensor are limited in several ways. Generally, only one threshold logic (min-max, above-for-time, etc) is available for a specific sensor or sensor type. Often, only one single instance of a threshold type can be used for a given sensor, such as only one range is able to be defined. Most typical systems lack a means by which severity can be assigned to an alert reported when a threshold is violated. This can restrict the ability to control the level of response to the problem. Most typical systems lack a means by which the status of more than one threshold logic can be combined together to produce more sophisticated logic, such as reporting a problem when both a temperature value is exceeded and a humidity value is out of range.

Another set of limitations typically associated with embedded monitoring appliances is limited alert processing functionality. Typical alert handling systems, particularly in embedded monitoring devices, include limitations such as: support for only a fixed set of alert response types, such as sending e-mail, SNMP traps, or alphanumeric pages; limited control over the invocation of responses based on time, the type of alert, the alert severity, or the age of the alert condition; and little or no support for capturing and saving data during alert processing to provide for delayed access or delivery of alert information.

Accordingly, an improved method and system for sensor monitoring, alert processing, and notification would be desirable.

SUMMARY

In a particular embodiment, the disclosure is directed to a system including a data management system configured to receive sensor data associated with a sensor, a monitoring system coupled to the data management system, and an alert handling system responsive to the data management system and configured to access an alert profile associated with an error object provided by the monitoring system. The monitoring system is configured to provide the error object in response to a monitoring algorithm associated with the sensor data.

In a further embodiment, the disclosure is directed to a monitoring appliance including a processor and a memory responsive to the processor. The memory includes computer implemented instructions operable by the processor to implement a data management system configured to receive sensor data associated with a sensor, computer implemented instructions operable by the processor to implement a monitoring system coupled to the data management system, and computer implemented instructions operable by the processor to implement an alert handling system responsive to the data management system and configured to access an alert profile associated with an error object provided by the monitoring system. The monitoring system is configured to provide an error object in response to a monitoring algorithm associated with the sensor data.

In another embodiment, the disclosure is directed to an interface including an alert action interface configured to receive data associated with an alert action, an alert profile interface configured to associate an alert profile sequence with an alert profile, and a sensor configuration interface configured to associate condition logic with sensor data. The alert profile sequence is associated with the alert action. The alert profile is responsive to an error object. The condition logic configured to produce the error object in response to the sensor data.

In a further embodiment, the disclosure is directed to a method of alert processing including generating an error object in response to a change in sensor data, initiating an alert profile sequence in response to the error object and performing an alert action in response to the alert profile sequence.

BRIEF DESCRIPTION OF THE DRAWINGS

FIGS. 2 through 15 are screen shots that illustrate exemplary interfaces to the system.

The use of the same reference symbols in different drawings indicates similar or identical items.

DETAILED DESCRIPTION

In a particular embodiment, the disclosure describes a modular and extensible set of applications that implement a versatile and robust monitoring and alert processing system. The system includes logic for defining the processing and handling of sensor data, logic for implementing rules to identify undesirable conditions (alerts) based on the measured values of those sensors, and logic for handling notifications to report alerts. In addition, the system may provide for an extensible, data-driven mechanism to automatically generate and present user interfaces for additional monitoring and alerting components.

The term 'monitoring appliance', as used in this disclosure, generally refers to a low-cost computing device built to perform a well-defined set of functions centered on the acquisition and processing of analog and digital sensor readings. Unlike personal computers (PCs) and other large scale computing devices, monitoring appliances typically have limited storage and limited computing power. Storage generally includes random access memory (RAM) and Flash memory. In general, mechanisms for collecting and producing the sensor readings in such an appliance involve significant interrupt mode and kernel mode processing unlike monitoring applications on PC devices. Applications on PC devices typically do the bulk of data collection and processing in "user mode," where full operating system functionality is available. In particular examples, the monitoring appliance may include applications for alarming and data communication through networks using standards, such as hypertext transfer protocol (HTTP), file transfer protocol (FTP), simple mail transfer protocol (SMTP), short message service (SMS), and simple network management protocol (SNMP). However, the system and method may be implemented in a PC or server system.

An exemplary device, such as the exemplary systems described below in relation to FIG. 18, includes interfaces to sensors and cameras for monitoring a space or environment about equipment. Cameras and microphones may also be used to monitor visual and audible indicators provided by the equipment. The device may include a connection to the equipment to monitor equipment operability, such as through SNMP. The device may journal sensor data. The data may be monitored by a monitoring subsystem. In the event of error conditions, an alert handling system may generate notifications and communicate with remote systems, such as telephonic or remote network systems.

Figure 1:
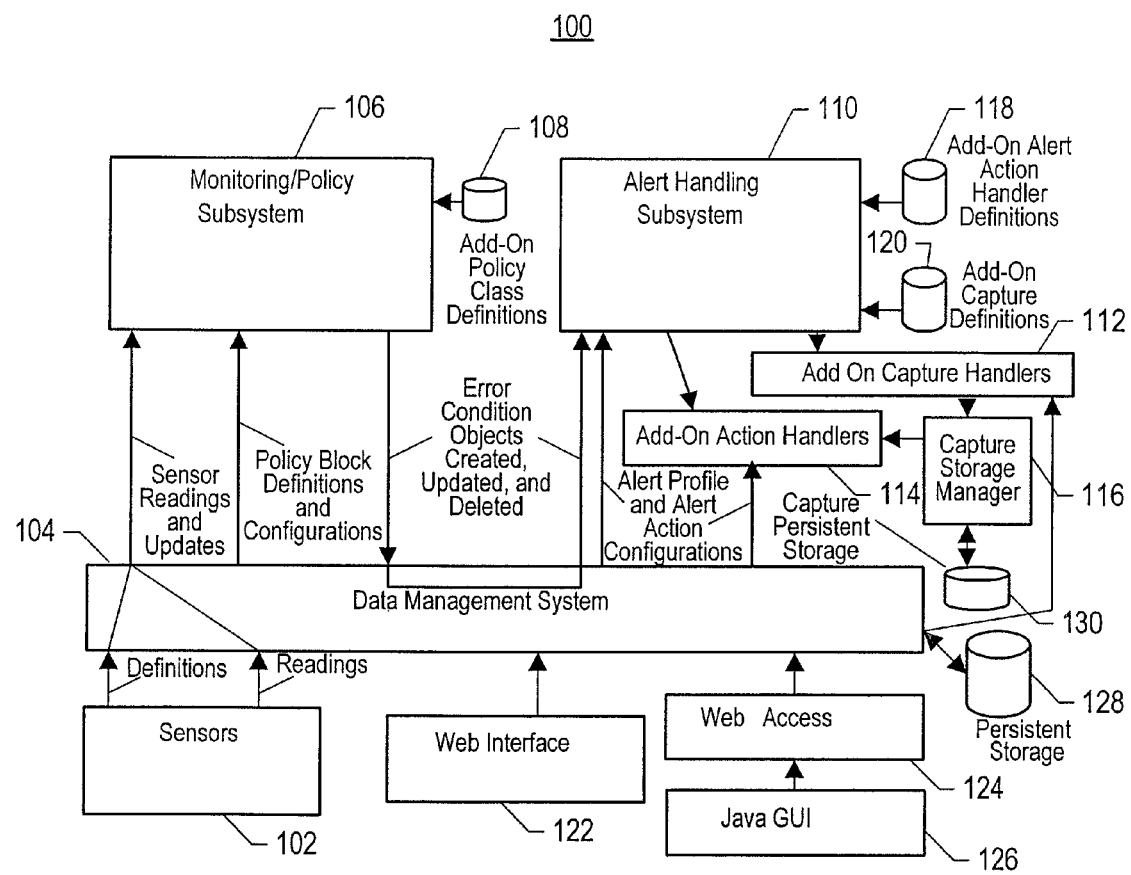
FIG. 1 is a block diagram that depicts an exemplary embodiment of the system.

Referring to FIG. 1, a particular embodiment of a system is implemented as a logical, event-driven pipeline. The system 100 includes sensors 102, data management system 104, monitoring policy subsystem 106, add-on policy class definitions 108, alert handling subsystem 110, add-on alert action handler definitions 118, add-on capture definitions 120, add-on capture handlers 112, add-on action handlers 114, capture storage manager 116, capture persistent storage 130, persistent storage 128, web interface 122, web access 124, and Java graphical user interface (GUI) 126.

The sensors 102 include components representing an extensible set of applications, including device drivers plus hardware sensors, user-mode applications that communicate with sensors through network or other high-level protocols (modbus, proprietary RS-232/485, SNMP, common information model (CIM)), or application-based instrumentation, such as data reported by application servers. These sensor applications 102 interact with the data management system 104 in two ways.

First, the sensor applications 102 "publish" descriptions of the instances of the sensors that exist, including data such as presentational labels, sensor type, units of measurement, range, value increment size, suggested threshold settings, suggested value formatting data, and data to aid in mapping the sensor output to various management protocols (such as SNMP).

Second, the sensor applications 102 report updates to the current value and status of each sensor that has been published. In one particular embodiment, sensor values are reported in an event-driven manner when they differ from the previous values reported. Event driven reporting improves system scalability, and allows the other applications to assume that a sensor's value is unchanged until an update has been reported. This method also removes the overhead involved in polling sensor values continuously. In a particular implementation, an example of the data published for a typical sensor is shown in Appendix A (encoded in XML).

The sensor applications 102 also may make use of data persistence features of the data management system 104, allowing sensor definitions to contain customizable and non-volatile settings, such as user-custom labels, and configuration data to assist the sensor application 102 with "re-associating" a sensor object reported to the physical sensor during system restart. For example, the data may include correlations between one or more USB-attached sensor pods and corresponding sensor objects previously stored in the data manager 104.

In a particular embodiment, the data management system 104 is a shared variable-space system, which may be implemented using data systems, such as the Windows Registry, a lightweight directory access protocol (LDAP) directory server, or other data management system. In an illustrative implementation, a lightweight custom system may be implemented using a kernel-mode device driver. This implementation allows for fast and efficient interaction with shared data from both other kernel-mode drivers, such as those used for driving add-on sensor hardware, and applications, such as SNMP-based management applications. The data management system 104 also includes a persistence mechanism that automatically stores objects that are declared to be "persistent" when registered and restores such objects after system restart. For example, the data management system 104 may store some variables in persistent storage 128. In addition, the data management system 104 may provide both programming to read the values of the objects and programming to "listen" to the objects, particularly sensors, so that sensor value updates are quickly received and available for processing.

The monitoring/policy subsystem 106 provides monitoring logic and algorithms for the appliance. Specifically, the subsystem 106 "listens" to the data manager 104 for updates on sensor values and updates to algorithm configuration data, and passes this update data into an event-driven logic engine that ultimately produces error condition objects. Error condition objects contain data to describe the occurrence of a problem. For example, an error may be detected based on a violation of thresholds implemented by the policy engine and its configuration. Error condition objects are created when a problem is detected and set to a "resolved" state when the problem is no longer indicated. These error condition objects, also referred to as "alerts," are published to the data management system 104, allowing access by other applications, such as the alert handling subsystem 110. An exemplary embodiment of a published error condition, encoded in XML, is shown in Appendix B.

The add-on policy class definitions 108 are XML-encoded definition files, optionally supplemented by custom code delivered in shared libraries (DLLs, or so files) that describe additional alert logic blocks.

In a particular embodiment, the base monitoring system 106 includes a number of standard logic block primitives. These logic blocks may include:

Boolean logic primitives, such as logical AND, OR, NOT, time delay elements (output=input as of N seconds ago), and hysteresis elements (output=input once input has been set for at least N seconds)

Numeric primitives, such as add, subtract, multiply, divide, time delay elements (output=input as of N seconds ago), hysteresis elements (output=input once input has been set for at least N seconds), bounding elements (output=input, constrained to a defined range), comparison elements (A>=B, etc), min-max elements (output=min(all inputs), output=max(all inputs)), and min-max over time elements (output=max(input over last N seconds)).

Time primitives, such as schedule blocks (output=true when time is configured time of day/day of week).

Error reporting primitives, such as blocks to generate/resolve error conditions when their inputs are 'true' (either in general, or for the sensor associated with a specific input).

In addition, the monitoring system 106 supports defining "composite blocks", consisting of a logical network of other blocks, used to derive a complex function block. The monitoring system 106 provides a number of such composite blocks, providing the following logic types, among others:

- Range thresholds (generate error if sensor is above a given value A or below a given value B)
- Minimum value thresholds (generate error if sensor is below a minimum value A)
- Maximum value thresholds (generate error if sensor is above a maximum value A)
- Minimum value for time thresholds (generate error if sensor is below a minimum value A for longer than time T)
- Maximum value for time thresholds (generate error if sensor is above a maximum value A for longer than time T)
- Rate of increase thresholds (generate error if value of sensor increases by more than N in the last T seconds)
- Rate of decrease thresholds (generate error if value of sensor decreases by more than N in the last T seconds)
- Invalid state thresholds (generate error if value of sensor is equal to value X—used for Boolean and discrete state sensors)
- Invalid state for time thresholds (generate error if value of sensor is equal to value X for longer than time T)
- State Mismatch Threshold (generate error is value of sensor is not equal to value X—used for Boolean and discrete state sensors)
- State Mismatch for time Threshold (generate error is value of sensor is not equal to value X for longer that time T)

Additional blocks can be defined by providing an XML-encoded file containing the definition of the block, by describing which other blocks to create and how to interconnect these blocks. An exemplary XML grammar that may be used in a particular implementation can be found in Appendix C.

Each block class, whether primitive (implemented using native code) or composite (implemented by combining other blocks based on an XML-provided class definition), may include:

- Parameters—these are configuration parameters, such as threshold limits, labels, timing data, and such, that are provided in order to define the desired behavior for a block of the class. In object-oriented programming, these would be defined as "instance variables" of the class. Each parameter definition includes a data type. For example, the parameter definition may include both a general type, such as integer, string, floating-point, and Boolean, and a specific subtype, such as an indicator that a string parameter is an IP address or a list of e-mail addresses, a label, a default value, a classification (basic or advanced), a units indicator, and references to limits on a parameter's value. Limits may, for example include explicit limits, limits based on the limits of a sensor associated with one of the inputs of the block, or limits based on the value of other parameters of the block.
- Inputs—these are input "signals" to the block, which are tied to a signal source. The signal source may, for example, be a sensor, or the output of another block. The definition includes a data type indicator, a label, and constraints on what classes of signal source can be used. The constraints on the signal source limit possible input sources to appropriate types of sensors. For example, a block particular to processing temperature readings might constrain its input to the class of objects representing temperature sensors.
- Input Sets—these are "lists" of similar inputs, which support having zero or more signals attached to them. Input sets are typically used like normal inputs, but for situations where the number of inputs is variable, such as the inputs to a block, which simply reports the maximum value among an arbitrary set of inputs. Each input set defines a label, data type, and a minimum and maximum number of signals.
- Outputs—these are "signals" produced by the block, which may be tied to the inputs of other blocks. The definition includes a data type and a label.

Composite block classes may also include a description of a set of block instances created to implement a block of the class, the interconnects between those block instances, and the outputs and inputs of the block to be defined (both input and output signals, as well as mappings of parameter values from the "parent" block into the "embedded" blocks that implement it). An example of a composite block definition is provided in Appendix D.

The data contained in the block definitions, in addition to providing the functional information for the monitoring subsystem 106 to create and manage the blocks associated with the class, also provides presentational information for the configuration tools to create or edit block instances. In a particular implementation, Java based GUI tools may be implemented that access data through an XML-encoded HTTP interface on the appliance. The data provided in the class definitions is used to generate the GUI interfaces dynamically, allowing new block classes to be added to the system without requiring custom development on the GUI tools.

Another use of composite block classes is to provide new sensor readings that can be "synthesized" from one or more existing readings. An exemplary synthesized reading is a block that takes inputs from a temperature sensor and a humidity sensor and produces an associated sensor reading that describes the vapor pressure of water.

The alert handling subsystem 110 is responsible for driving responses to error conditions reported by the monitoring subsystem 106 or other sources. For example, the alert handling subsystem 110 "listens" to the data manager 104, responding to error conditions created or updated within the data manager 104. The alert handling subsystem 110 may also listen to the data manager 104 in order to receive its configuration information, particularly with respect to alert profiles and alert actions.

In a particular embodiment, the alert handler subsystem 110 implements the response to an error condition by following a procedure described by objects, such as alert profiles. Each alert profile defines a set of one or more response sequences. Each sequence defines a set of alert actions to be taken, the time after the beginning of the alert to execute the actions for the first time, the interval between this time and repeated runs, and a maximum number of repeated runs. These sequences may be used to implement escalation policies: allowing the system to run one set of actions when an error condition first occurs, a different set if the condition is still unresolved after a period of time, and additional actions at an even later time. Also, it allows some actions to happen repeatedly at different rates. An example of a set of sequences in an alert profile might read:

Sequence 1: at T=0 sec, repeating 3 times every 300 sec, do:
  Send E-mail to Fred
Sequence 2: at T=1200 sec, repeating 5 times every 1200 sec, do:
  Page Fred and George
Sequence 3: at T=7200 sec, repeating 0 times, do:
  Turn on alarm siren
  Page Fred's Boss
Sequence 4: at T=sec, repeating 1000000 times every 60 sec, do:
  Send SNMP trap to NetView This exemplary set of sequences would result in a sequence of actions, starting with Fred getting an e-mail as soon as a problem was detected and every 5 minutes until the problem is either resolved or until 15 minutes have passed. After 20 minutes, if the problem is still unresolved, both Fred and George get paged, and get paged again every 20 minutes until 2 hours have passed or the problem is resolved. After 2 hours, if the problem is still unresolved, an alarm siren is triggered and Fred's Boss gets paged. In parallel with this escalation, SNMP traps have been sent once per minute from the time when the problem first occurs.

A particular embodiment of an action profile also includes support for enabling and disabling sequences, based on a schedule, such as the time-of-day and day-of-week. The feature may operate by not taking the prescribed actions if the time that those actions would occur does not match the constraints of the schedule. In addition, alternate sequence may be defined to better align with work shifts, for example. In the above example, one might make "Sequence 1" constrained to M-F, 7 AM-7 PM, for example, when Fred is on call, and add "Sequence 1a" for M-F 7 PM-7 AM which e-mails George, for example, when George is on call. An example of a profile definition, in XML format, is shown in Appendix E.

Each of the actions referred to by an alert profile ("Send e-mail to Fred") is defined by an alert action object. Each alert action object is an instance of a general action handler ("Send E-mail") defined by an alert action class object. Alert action class objects are registered with the alert handler subsystem 110, for example through XML-encoded registration files, and may be processed by invoking add-on executables, such as those indicated by the registration files.

Alert action objects, when configured, can be defined to request the capture of additional data supporting the alert before they are invoked. In a particular implementation, the data may include image files showing graphs of the value of the sensor associated with the alert, audio clips captured from one or more microphones accessible to the appliance, and picture sequences captured from one or more cameras accessible to the appliance. Sensors or cameras accessible to the appliance may be integrated, attached or accessible via wired or wireless communication. These capture choices are driven by several factors:

What capture handlers are available and configured? For example, is the picture capture handler available, and which cameras have a configuration defined to have pictures captured (how many, at what rate and at what resolution)?

Which objects were associated with the alert being processed by the threshold that generated the alert (for example: Which sensor? Which cameras? Which microphones?)?

What types of captured data are supported by the alert action? For example, SNMP traps cannot send pictures or graphs, but the e-mail action handler can.

Based on these factors, each alert action that is triggered as part of alert handling will yield zero or more "capture actions" that are to be executed before the given alert action has the desired information. The alert handler subsystem 110 may invoke the desired capture actions and invoke alert actions that do not use data from the capture actions. The capture actions may include those defined on the appliance or those defined on other remote appliances. The alert actions can include data captured by these actions, whether remote or local. As the capture actions complete, the alert actions that utilize the captured data may be invoked, such as when captured data requested is available.

The alert handler subsystem 110 also keeps track of alert actions that have been invoked at least once for the sake of a given error condition. When the error condition becomes "resolved", the alert handler subsystem 110 may invoke each of these actions one last time, such as with a parameter indicating "return-to-normal" versus "error", allowing the actions to report the appropriate "problem resolved" situation.

In an exemplary embodiment, alert actions support a variety of parameters for controlling whether they are to be executed. Specifically, each alert action instance may have a schedule to control whether it is enabled or disabled by time-of-day and day-of week. Also, each alert action may be configured to be triggered for error conditions of specific severities. An exemplary implementation supports a 5-level severity scheme: information, warning, error, critical, and failure. The severity, for example, may be defined by the logic creating the alert or error object.

For certain captured data, such as camera pictures, it may be desirable to capture and store more data than may be practical or desirable to transmit. For example, capturing 5 frames per second of video of an intrusion may be appropriate, but sending 30 seconds of such video (150 frames, which would likely be several megabytes of data) would be inappropriate for most e-mail systems. To handle this, the alert actions may support configuring limits on the amount of data that the action should actually process independent of how much is actually captured. Specifically, the action can be configured to include up to N of the pictures that were captured where N is, for example, user-settable. The alert actions can process this data, and use it to select a subset of the data captured. If N=10 and 150 pictures are captured, every $15^{th}$ frame may, for example, be included in the e-mail. By having configuration control, the system can send appropriate levels of information through the different notification mechanisms. For example, the system may capture 150 pictures and send all of them to an FTP server for archiving, while sending a sampling of 10 of them to an administrator through e-mail.

In an exemplary embodiment, the alert handler subsystem 110 is informed of the types of data that may be captured and the particulars on how to invoke executables to implement those captures through capture definitions, such as add-on capture definitions 120 (e.g. an XML-encoded registration file). Each add-on capture handler definition 120 provides a file, which may contain data such as the name of the executable, such as add-on capture handlers 112, to be invoked (whether a shared library and entry point to be called "in-process" or an executable to be run as a separate process), concurrency limits (how many captures of this type can/should be allowed to run at one time), which types of objects these captures are "tied to" (picture captures may be defined relative to a camera object, graphs to a sensor, audio clips to a microphone), and what parameters need to be defined to specify the capture (number of frames, frame rates, etc).

The alert handler subsystem 110 may use the information in the add-on capture handler definition files 120, coupled with the capture configuration settings based on these files and provided by the user, to invoke the capture handler executables 112 when a data capture is requested. When invoked, these executables are provided with the object ID of the capture source "tied to" them (i.e. the camera tied to the capture configuration), the error condition object causing the capture, as well as the alert action and alert profile associated with the handling of the capture. The capture handler 112 uses this data to determine how to process the capture. The capture handler 112 captures the requested data and stores the data into the capture storage 128 through the capture storage manager 116. For example, the capture storage manager 116 may store captured data in the capture persistent storage 130. Once stored, the capture handler 112 creates a special object that describes the data captured, and includes information to retrieve the data from the capture storage manager 116.

In a particular embodiment, the alert handler subsystem 110 is informed of the types of notification actions that may be taken, and how to invoke the executables needed to implement those actions through action handler definitions, such as add-on action handler definitions 118, which may be an XML-encoded registration file. Each alert action handler definition provides a file that may contain data such as the name of the executable, such as an add-on action handlers 114, to be invoked (whether a shared library and entry point to be called "in-process" or an executable to be run as a separate process), concurrency limits (how many captures of this type can/should be allowed to run at one time), which types of capture can be processed by the action, and what parameters need to be defined to specify the action (e-mail addresses, URLs, etc). An example of an add-on action handler registration object is provided in Appendix F.

The alert handler subsystem 110 may process alert actions by invoking the executables defined by the alert action handler definitions 118 associated with the alert action class of the action to be run. These executables, such as add-on action handlers 114, which may be in-process shared-libraries or separate processes started by the alert handler subsystem 110, are passed information including the object ID of the error condition, alert action, and alert profile objects driving their invocation. This information may be used by the action handler executable to access the necessary objects in the data manager 104 to provide the data needed to process the action. If the action is configured to process captured data, the action handler, such as add-on action handler 114, enumerates the captured data objects that are associated with the activation of the alert profile for the given error condition, and retrieves the data from the capture storage manager 116. An example of the configuration of an alert action handler definition is provided in Appendix G.

Action handlers may include executables, scripts, and programs configured to perform one or more functions such as email, FTP, HTTP POST, SMS, SNMP, audio output, pager output, telephonic output, controlling digital or analog outputs, and switching power on/off. An illustrative implementation provides a number of default alert action handlers configured to perform the following:

Sending E-mail generates a plain text or HTML-encoded e-mail to a desired set of recipients, such as those provided through the action configuration and provided by the policy subsystem 106 through the error condition. The e-mail may include a link back to the monitoring appliance, allowing the recipient to browse to the appliance and specifically, to a web page providing a real-time status of the error condition and to capture data associated with the error. The e-mail may include graphs of sensor data associated with the error, picture sequences from one or more cameras, and audio clips from one or more microphones. The action may support utilizing one or more backup SMTP servers, so that failure to deliver to the first SMTP sever results in a transparent fail-over to delivering through the backup(s). Delivery using encrypted and secure STARTTLS and SSL-based encrypted extension to SMTP may also be provided.

Sending FTP generates and transfers an XML-encoded file describing the error and the objects associated with the error (sensors, pods, etc) and uses the FTP protocol to transfer this file to an FTP server. The action may also deliver picture files, audio clip files, and graph image files that have been captured. The action may be configured with additional backup FTP servers, allowing fail-over to those servers in the event that the files cannot be transferred to the provided FTP server.

Sending HTTP POST generates and transfers files, such as an XML-encoded file, describing the error and the objects associated with the error (sensors, pods, etc) and uses the HTTP protocol to transfer this file to a web server, for example, as part of a "multipart/form-data" encoded HTTP transfer similar to the sort of transfer done by a web server when submitting FORMS that include FILE input parameters. The action may also deliver picture files, audio clip files, and graph image files that have been captured. The action can be configured with additional backup HTTP servers, allowing fail-over to those servers in the event that the files cannot be transferred to the provided HTTP server. Support for HTTPS, including various degrees of certificate authentication and exchange of client certificates, may be included.

Sending SMS e-mail generates a short, plain-text e-mail suitable for SMS devices (pagers, cell phones, PDAs) or other devices where small message size is preferred. The action supports fail-over and encryption features similar to the Send E-mail action.

Sending SNMP Trap, for example, generates an SNMPv1 encoded trap and transmits it to an SNMP manager at a given address. The SNMP enterprise object identification (OID) may be provided by data from the alerting object (sensor type or pod), and the enterprise specific type is provided by the alert type object.

Playing audio generates an audio message, and may play the audio message over a set of speakers attached to an audio output. The message may be generated by concatenation of a set of prerecorded message clips. A particular implementation uses a set of clips for each severity ("Information", "Warning", etc), followed by a set of clips for the different sensor and object types generating the alarm ("Temperature", "Humidity", "Sensor Pod", etc), followed by a set of clips for the different error types ("Too High", "Too Low for Too Long", "Unplugged", etc), followed by the message "Problem Resolved" when the error is resolved. An example message would be "Error . . . Temperature . . . Too High", or "Warning . . . Sensor Pod . . . Pod Unplugged". The action may support selecting on which audio outputs to play the message, and with what volume. The system may support adding new audio clips as part of adding new sensors or new alert types.

The capture storage manager 116 manages the memory 130 allocated to the storage of captured data. This storage can take different forms (possibly Flash, RAM, or magnetic media), and can be of varying sizes. In one particular implementation, the storage 130 for the capture data may be provided using a RAM-based file system or a traditional file system based on a USB-attached hard drive. The capture manager 116 provides an interface to access this storage, for example, for the sake of creating and writing sets of capture data to the storage, and for retrieval of this data from storage. The capture storage manager 116 may provide several features, such as an abstraction, similar to a file system, to shield the other applications from the particulars of the different mechanisms of storage that may be implemented.

The capture storage manager 116 manages the data stored within the storage, discarding data as new data demands additional space. Specifically, when new data is being captured, the capture manager transparently handles conditions when the storage is exhausted, for example, implementing an "age-out" algorithm that deletes the oldest unused data captures from the storage in order to make room for the new data. Alternate algorithms, such as ones sensitive to error state (resolved versus unresolved), severity, data size, or combinations of the above, can easily be employed by the capture storage manager 116. The capture storage manager 116 monitors the deletion of error conditions that "own" the captured data, and cleans up the data accordingly. The capture storage manager 116 may also provide a locking mechanism for captured data, allowing applications such as web interfaces, to "open" a set of captured data and read portions of the data safely by preventing deletion of the data while the records are open.

The capture storage manager 116 may provide support for recognizing duplicate data records provided by different capture handlers 112 and may prevent duplication of the data stored. In a particular implementation, this is accomplished by using strong hash codes (such as MD5) for each data object, recognizing duplicates by keeping a cache of hashcodes versus recently stored objects, and storing the data in a file system supporting hard-linking so that, for example, the duplicated data can be stored in a single i-node while still being referred to by two or more different hard-links.

The system may provide a set of HTML-based web interfaces 122 or 124 for accessing the status of the sensors monitored by the device and for allowing access to summaries of the error conditions, the details of each error condition, and the captured data associated with these conditions. The interfaces may be provided using CGIs that generate HTML documents using data acquired by querying the data manager 104 and the capture manager 116. Examples of the interfaces are provided in FIG. 2 through FIG. 15.

Figure 2:
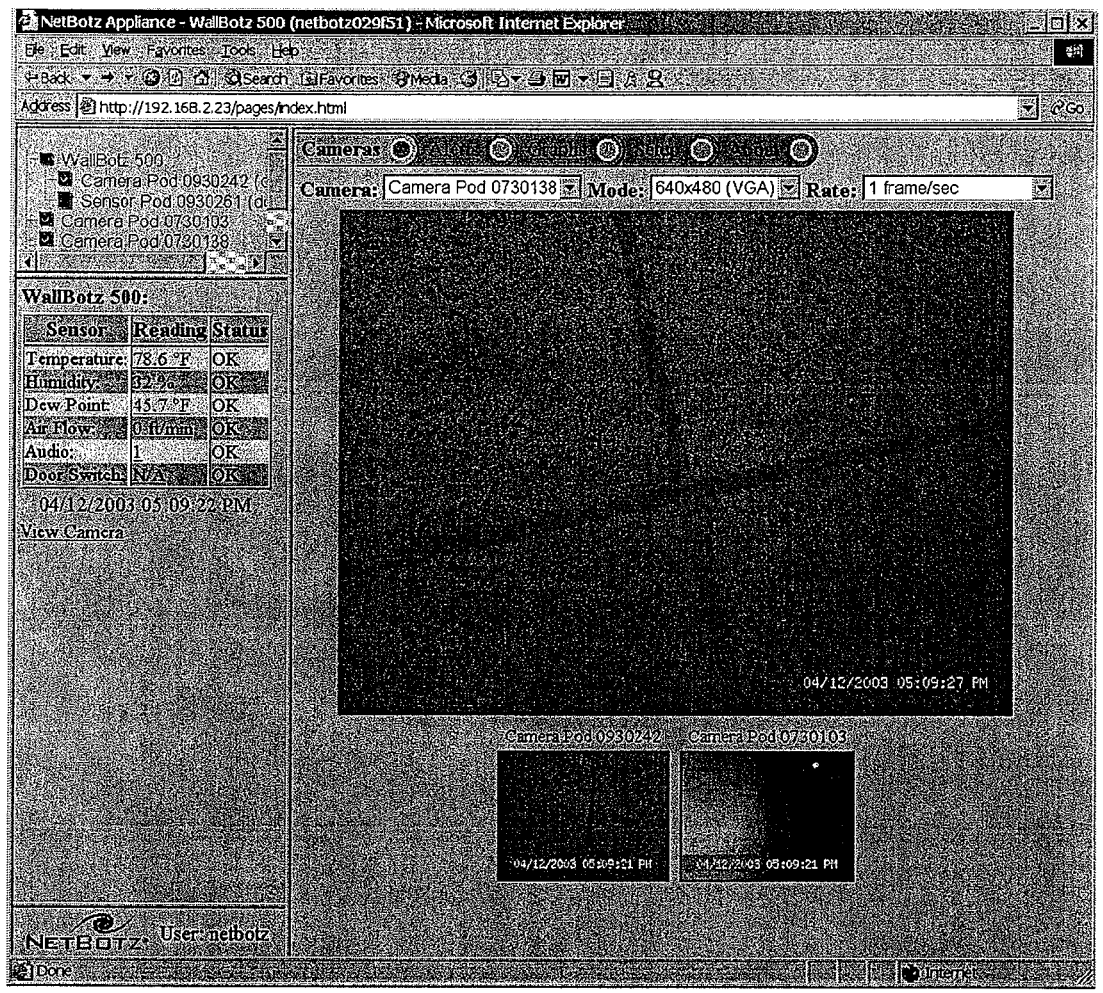

FIG. 2 shows an exemplary interface depicting the display of camera image data. Data associated with a monitoring system, including sensor data and alarm status, is shown on the left. Optionally, a tree structure may be provided for selecting pods and other devices, as shown in the upper left corner of the exemplary interface. Image data may be interchanged by selection of another camera from the drop-down menu or a thumbnail or small image located below the presently selected camera image. In addition, other data views may be accessed via tabs located, for example, at the top of the page, such as camera, alerts, graphs, setup, and about tabs.

Figure 3:
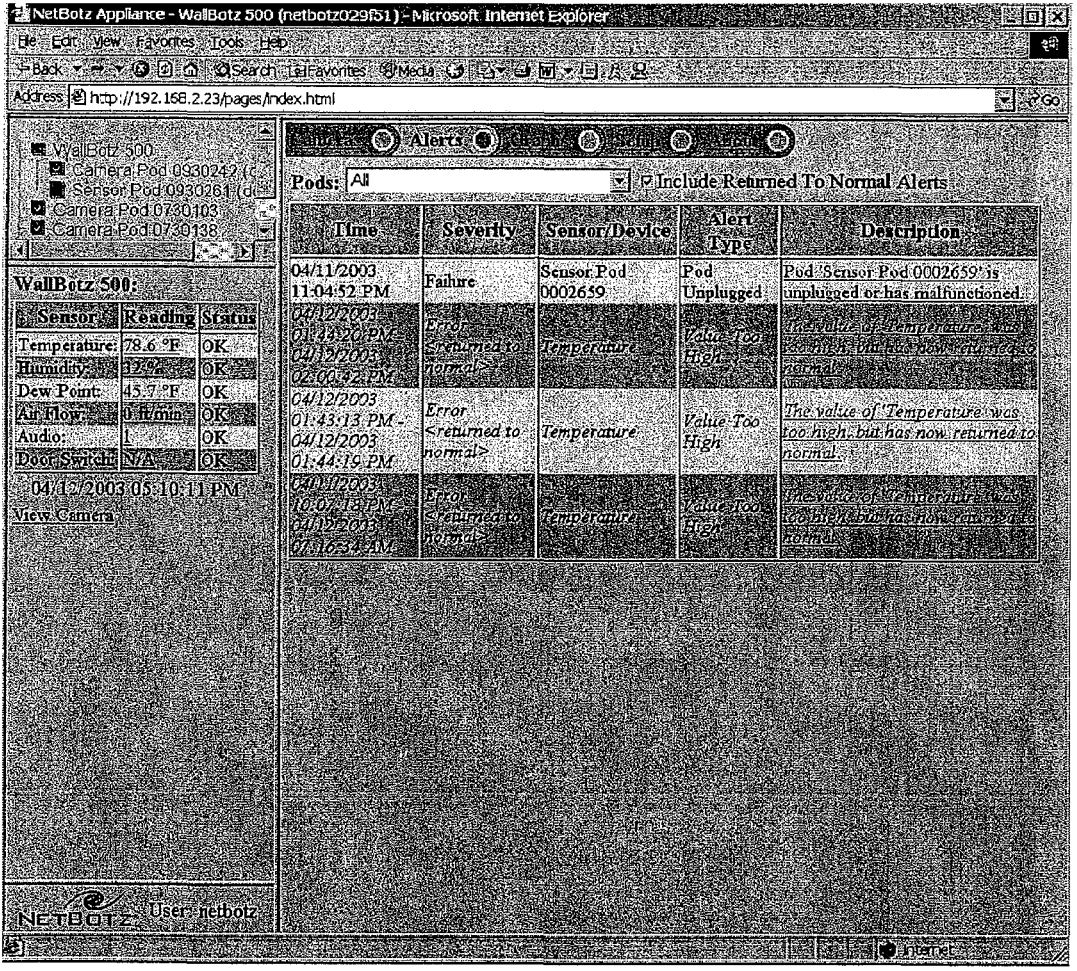

FIG. 3 depicts an exemplary summary of alerts for a monitoring system. A table of alerts is shown for sensor devices, such as sensor pods, associated with the monitoring system. Alternately, the table may be subdivided by pod through selection of an item in a drop-down menu. Specific alert details may be accessed through links, such as links associated with the description.

Figure 4:
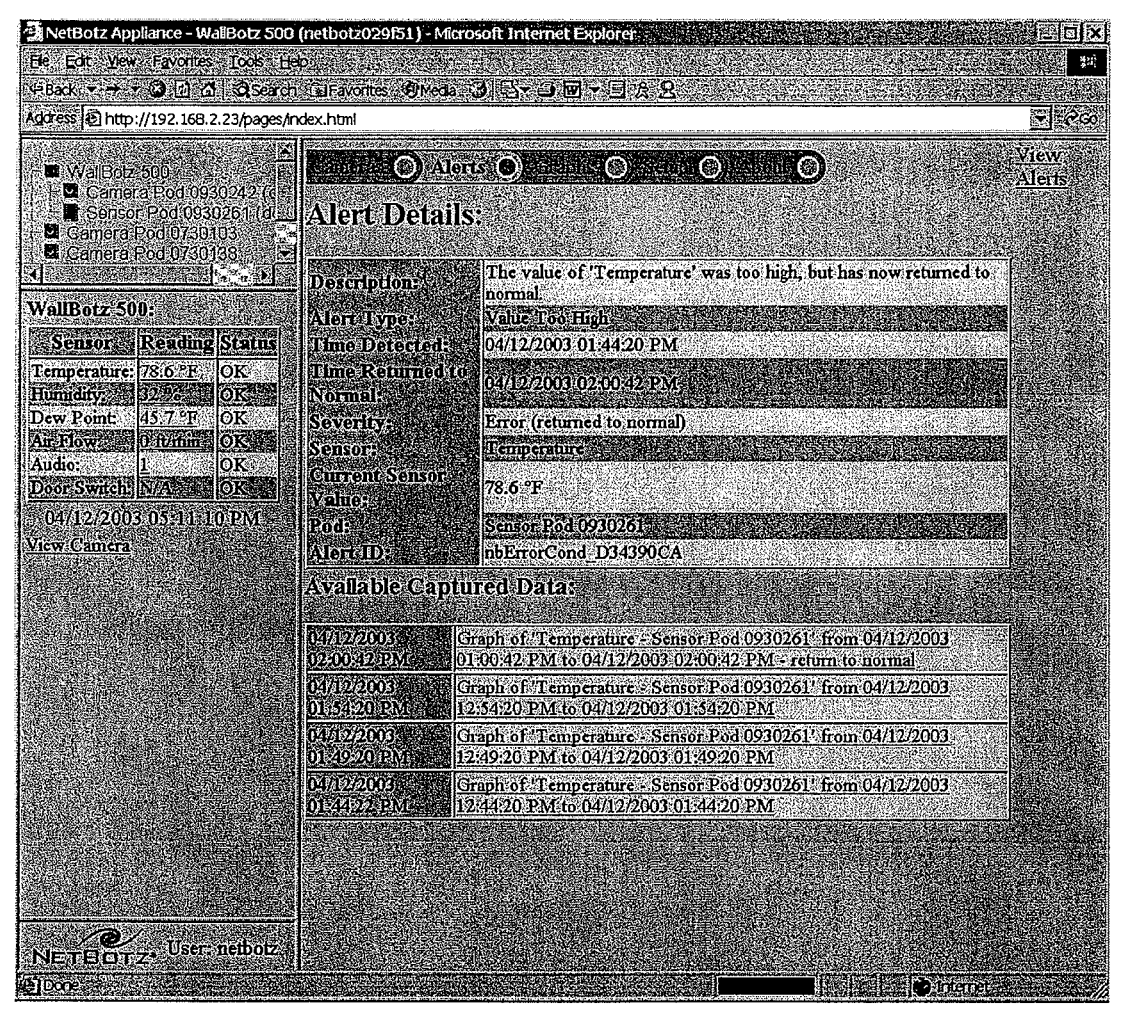
Figure 5:
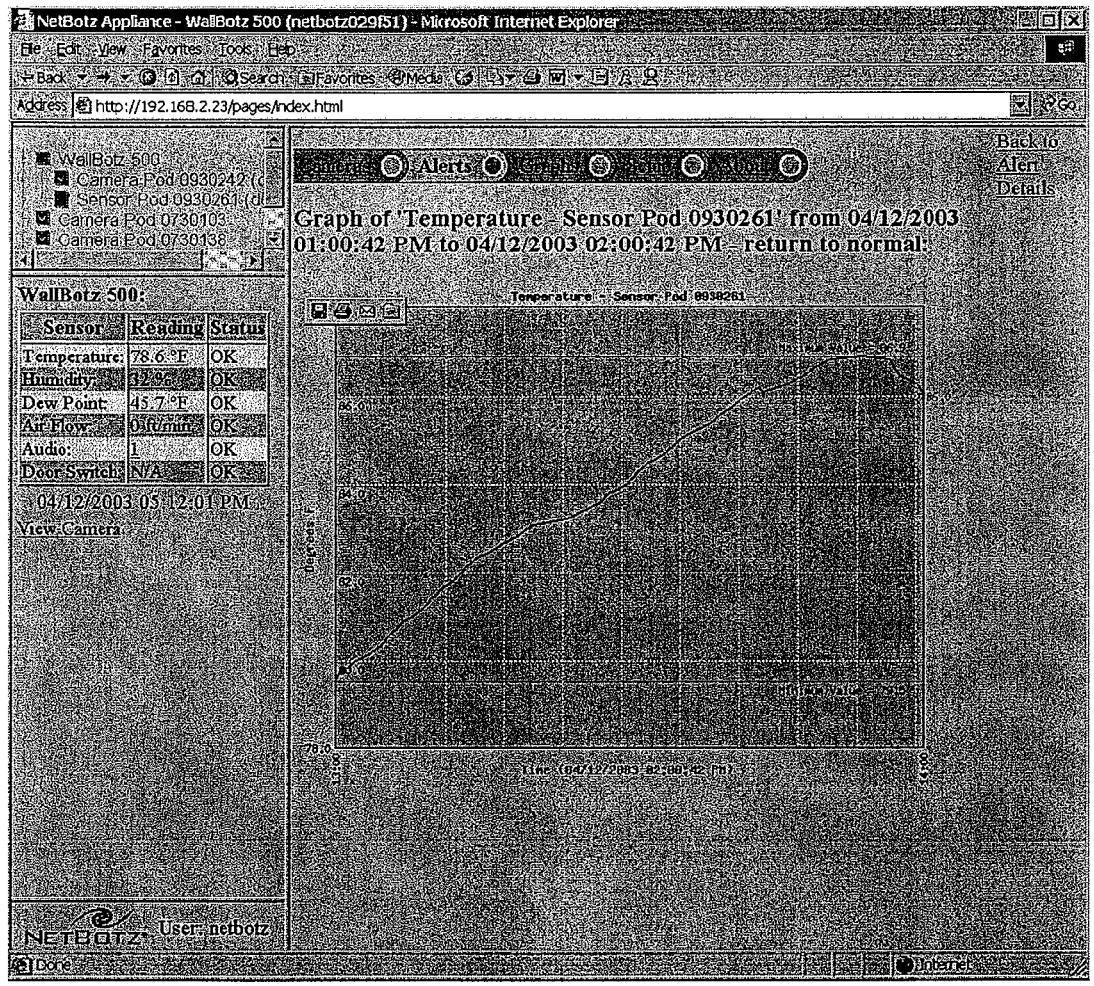

FIG. 4 shows an exemplary interface depicting alert details for a selected alert. Alert details may include a description of the alert, alert type, time detected, time normalized, severity, current values, and identifiers for the pod, error type and error objects. The alert details may provide a link to captured data associated with the alert, such as, for example, data links listed below the alert details. The captured data may, for example, include graphs, audio and video data. FIG. 5 depicts an exemplary interface having the captured data, in this case, a graph of temperature.

Figure 6:
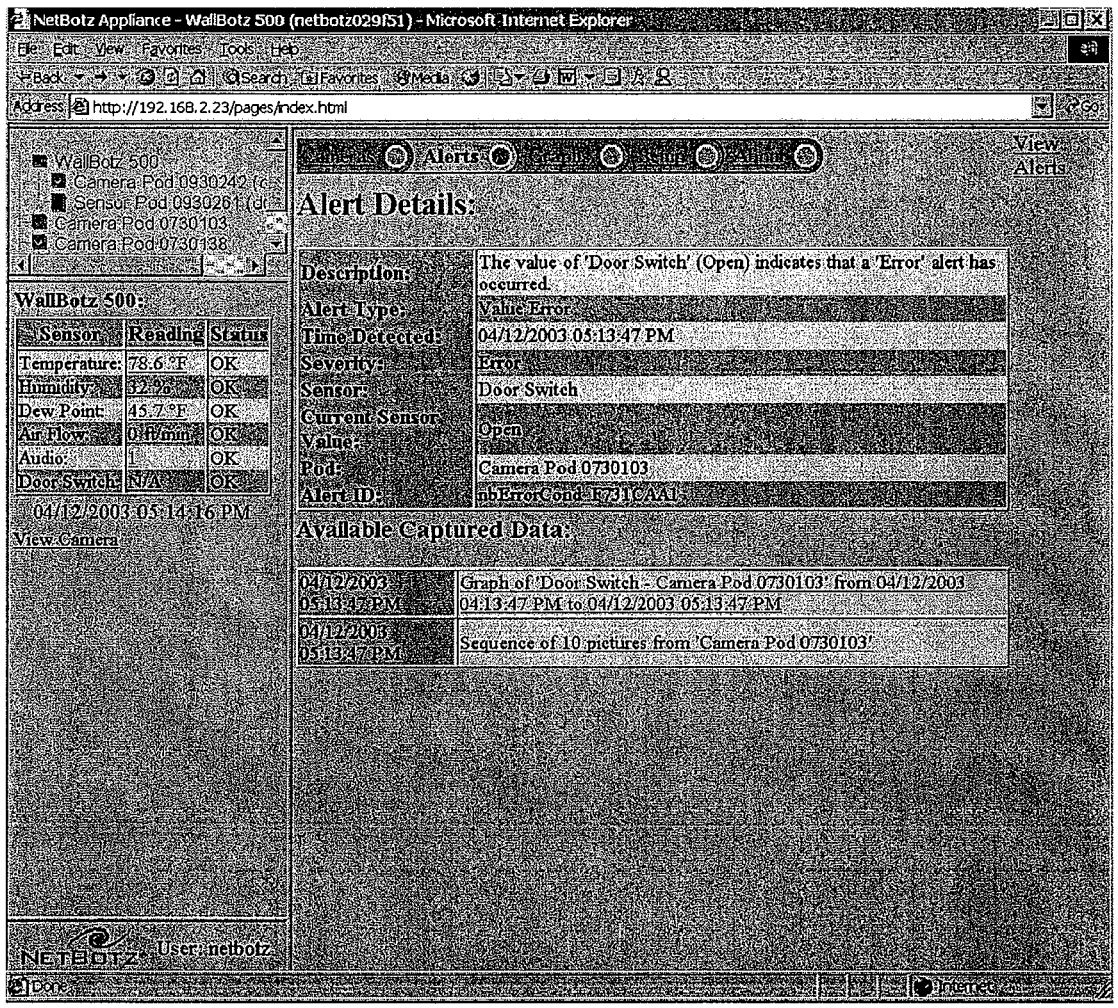
Figure 7:
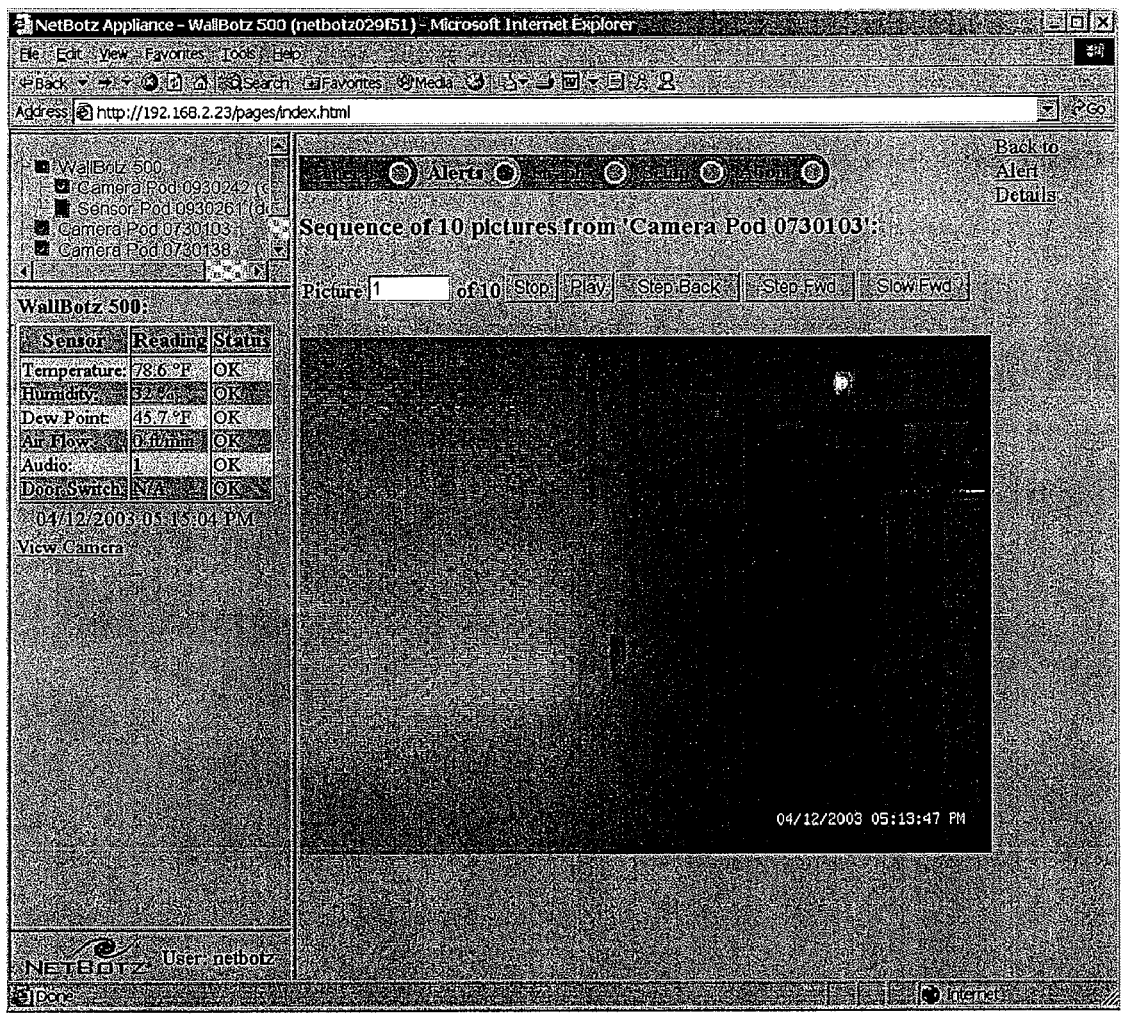

FIG. 6 depicts an exemplary details interface for another alert. In this exemplary embodiment, the captured data includes a sequence of pictures. FIG. 7 shows an exemplary interface for accessing these pictures. An interface is provided to play the images sequentially or to select a desired image.

Figure 8:
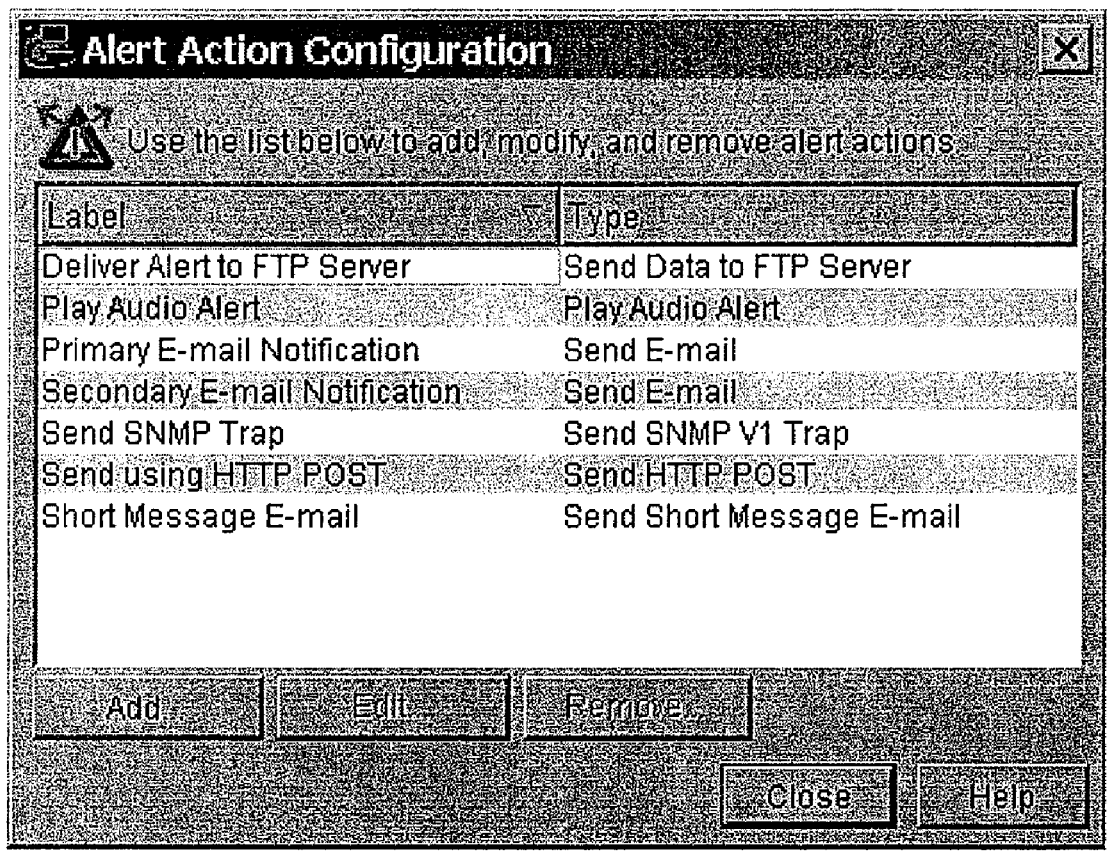
Figure 9A:
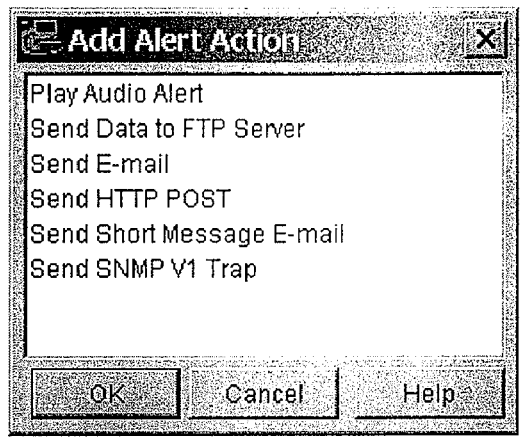
Figure 9B:
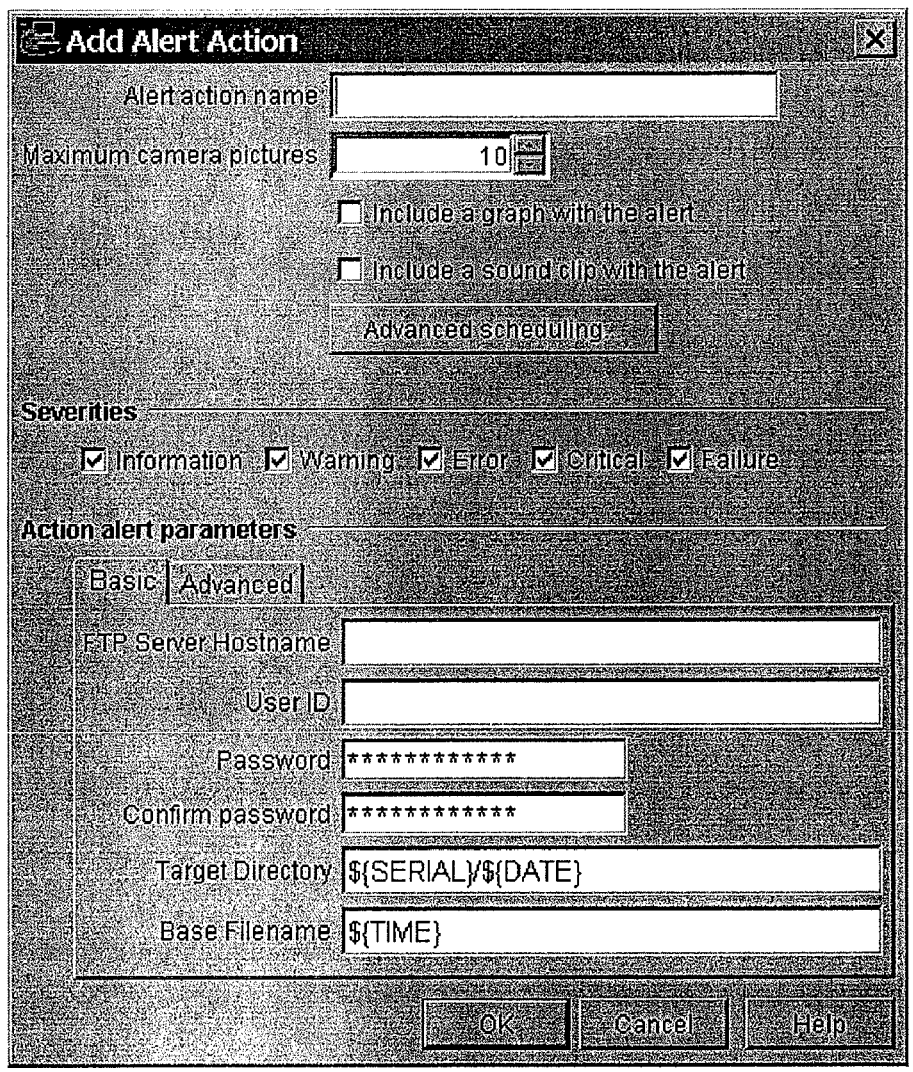
Figure 10:
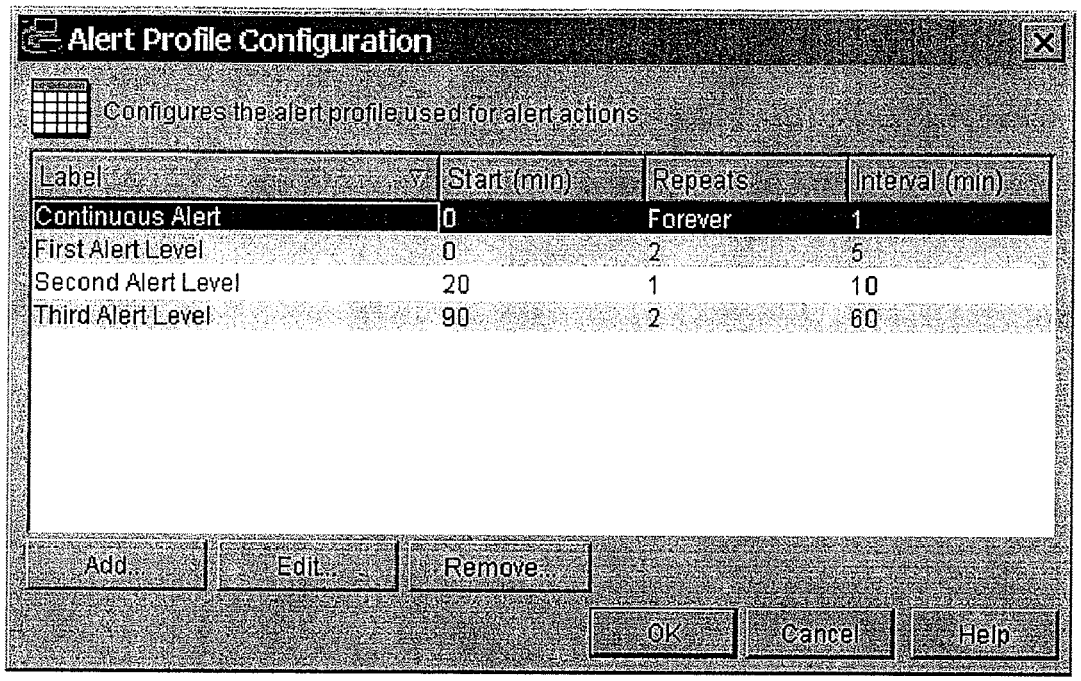
Figure 11:
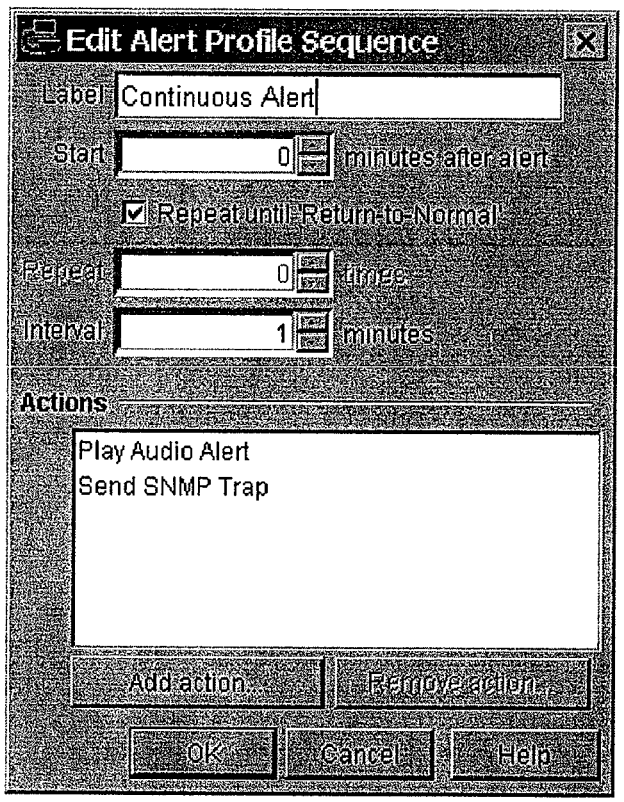
Figure 12:
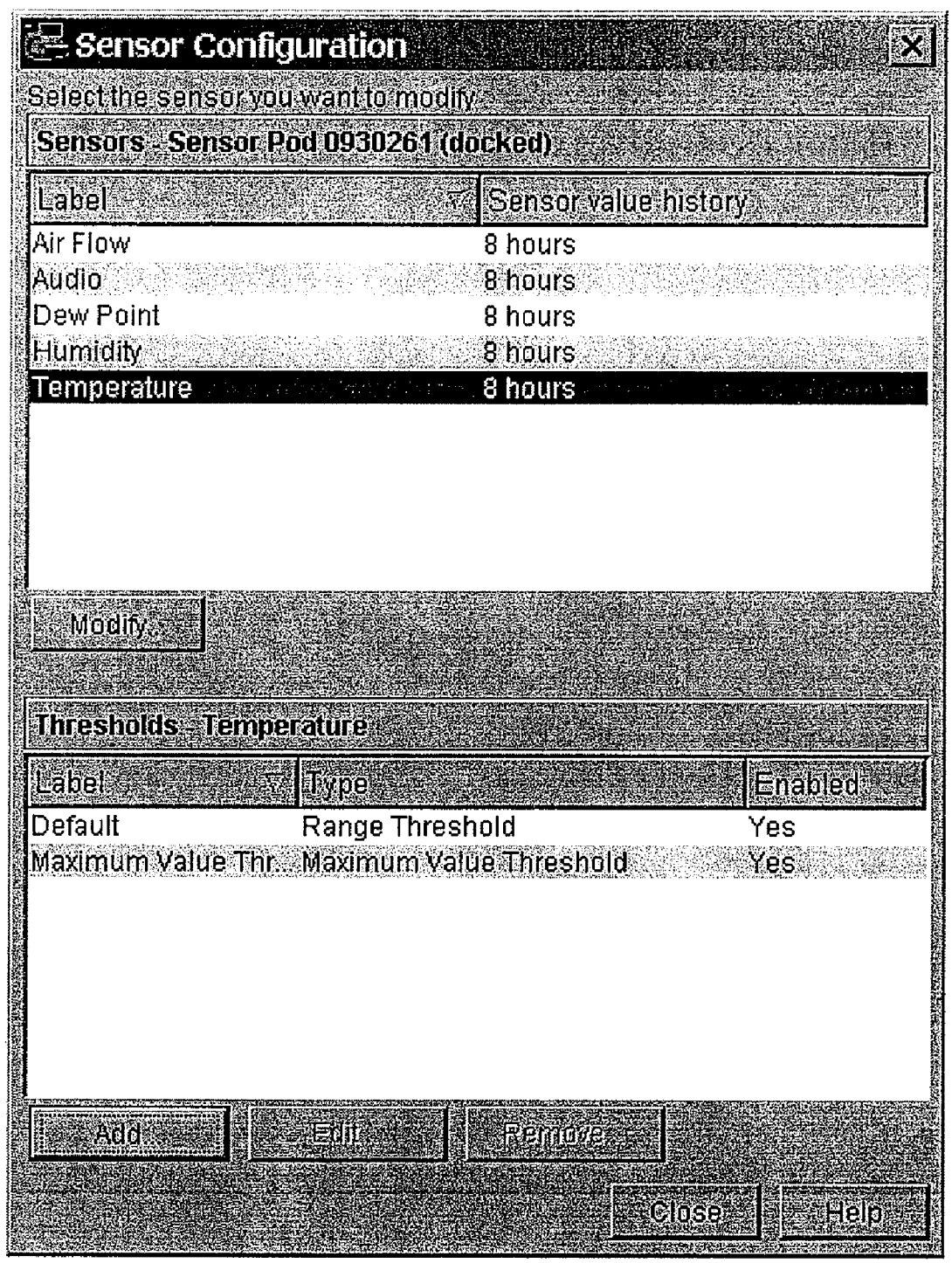

FIG. 8 illustrates an exemplary interface for configuring alert actions. Alert actions may include sending data, such as via FTP, email, SNMP traps, HTTP posting, and SMS. Alert actions may also include playing an audio alert via a local speaker or generating an audio message. An alert action may be added, edited, or removed through this interface. If "add" is selected, an exemplary interface as depicted in FIG. 9A may be displayed. Once an alert action is selected, configuration data may be entered and associated with the action through an exemplary interface, such as that shown in FIG. 9B. The alert action may include settings regarding the amount and type of data to be transferred, advanced scheduling, error severities to which the alert may apply, and addressing data. FIG. 9B depicts exemplary addressing information for an FTP transfer.

Alert actions are often accessed by alert profiles. Alert profiles generally detect error objects and determine which alert actions should be applied. Alert profiles may be configured with an interface, such as the exemplary interface shown in FIG. 10. Alert profiles may include a sequence of triggers, termed alert profile sequences. The alert profile sequences may be labeled and provided with a start time, number of repeats and interval between repeat. For example, the start time may be a time relative to the detection of an error object, such as 0 minutes, 20 minutes, or 90 minutes. The actions associated with the profile may be performed once, more than once, or continuing until the error is resolved. Scheduling and alert sequences may be added, edited, or removed. For example, alert sequence configurations may be added as shown in the exemplary interface of FIG. 11. The alert profile sequence is provided with timing data and associated actions.

Figure 13A:
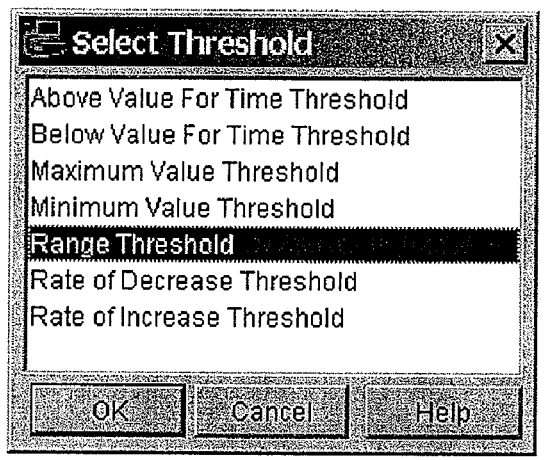
Figure 13B:
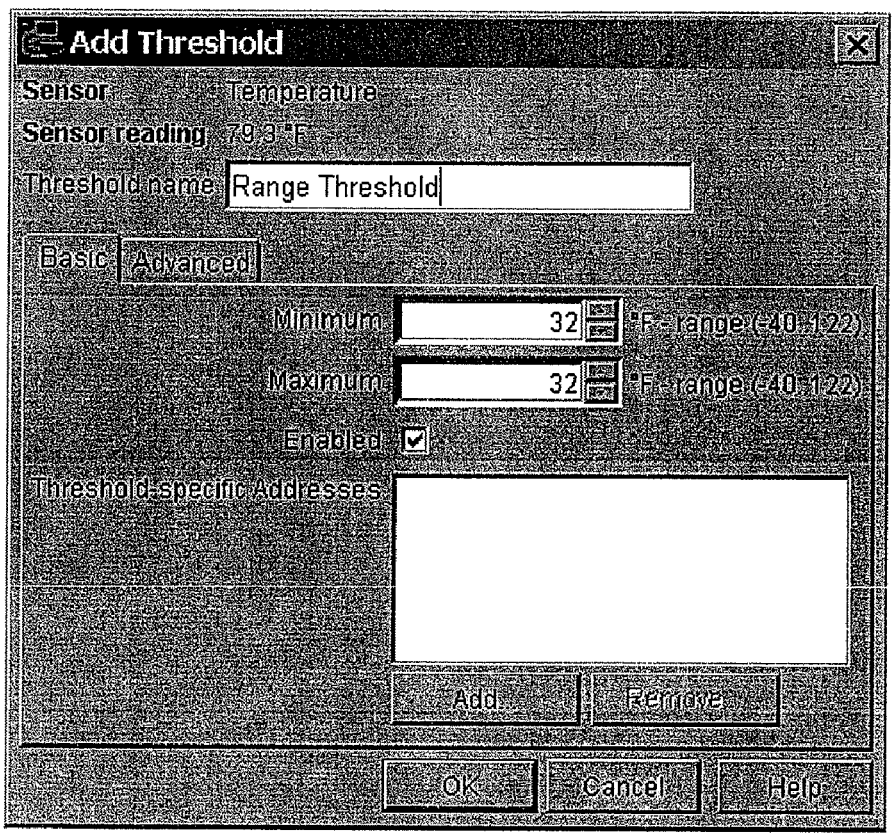
Figure 14:
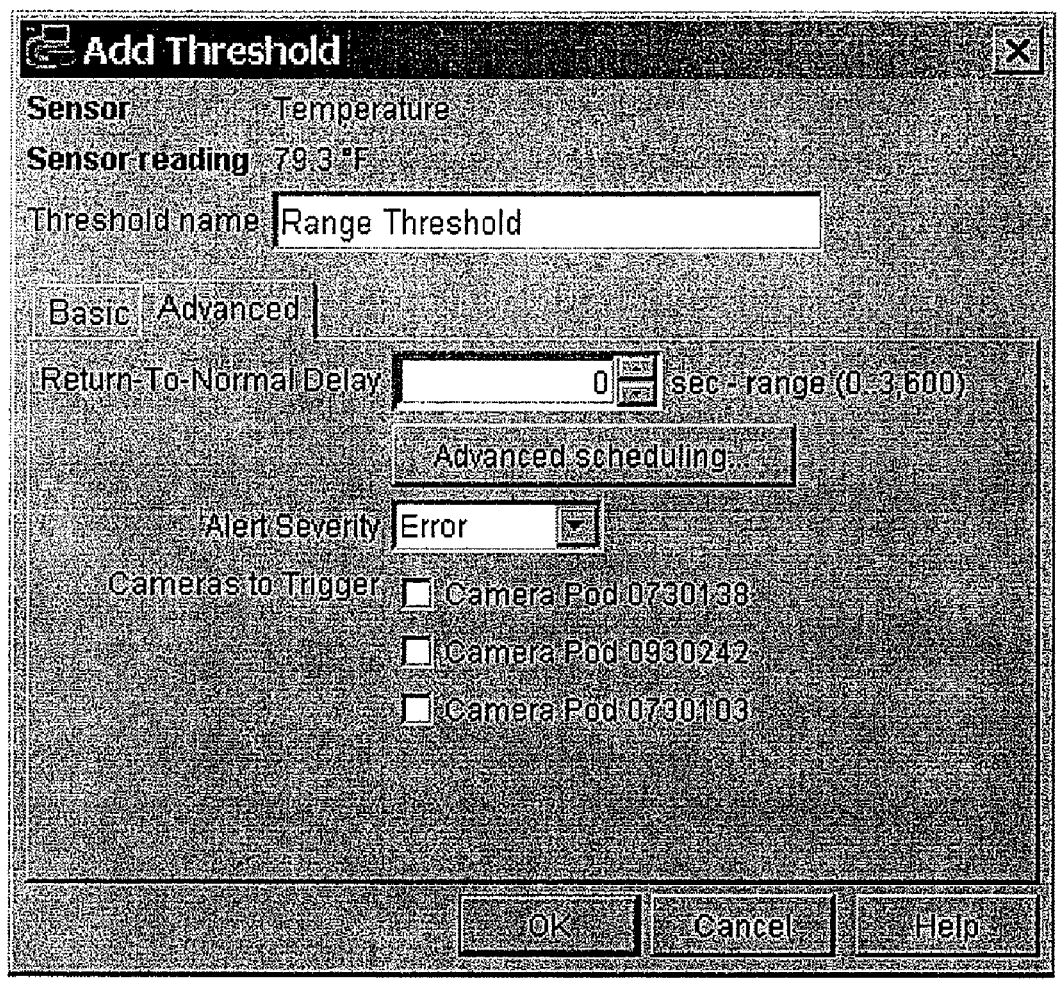

Alert profiles are triggered based on the detection of an error object. The error object maybe created by a monitoring subsystem in response to a change in a sensor value and registered with the data management system. Sensors, pods, or other data objects may be registered with the data managements system and the monitoring subsystem. For example, sensor pods may be configured through an interface such as that of FIG. 12. Available sensors may be selected, configured, and provided with conditions that result in the creation of an error object. These conditions (in this exemplary embodiment, thresholds) may be added using the exemplary interfaces of FIGS. 13A and 13B. FIG. 13A depicts the selection of a threshold and FIG. 13B depicts the configuring of a threshold. Advanced threshold configuration is depicted in the exemplary interface of FIG. 14 and may provide for advanced scheduling and capturing of data. For example, a list of cameras is provided in FIG. 14.

Figure 15:
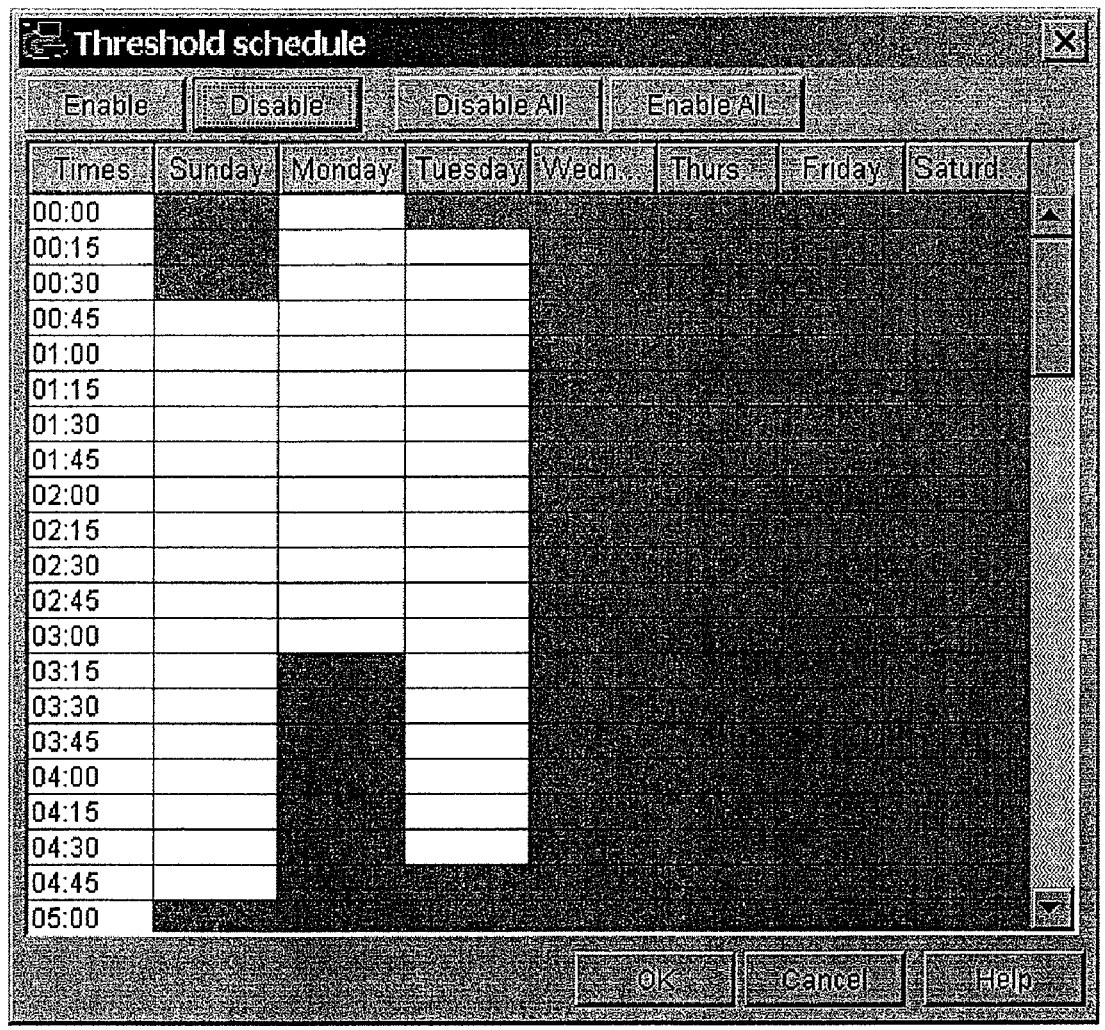

An advanced scheduling interface may also be provided. For example, FIG. 15 depicts a weekly scheduling calendar for enabling and disabling the threshold schedule. Such a scheduling interface may also be provided for alert profiles, alert profile sequences, and alert actions.

In an alternate embodiment, condition logic may be provided through add-on policy class definitions 108. These definitions may provide for complex definitions utilizing one or more simple blocks. Add-on policies may, for example, utilize threshold block and conditional blocks to determine error severity. In addition, alert actions and capture definitions may be provided, such as through XML documents.

Turning to FIG. 1, these interfaces may be implemented through the web interface 122, web access 124 and JAVA GUI 126. Similar exemplary interfaces may be supported for use in a centralized, mass-configuration and mass-management oriented product. As with the appliance's Java GUI 126, a centralized product may use the Web Access interfaces 124 to acquire and manipulate the appliance status and configuration. In the case of the centralized product, the design may use a 3-level scheme, with a Java GUI communicating with the management server, which then communicates with the appliance on the GUI's behalf.

Figure 16:
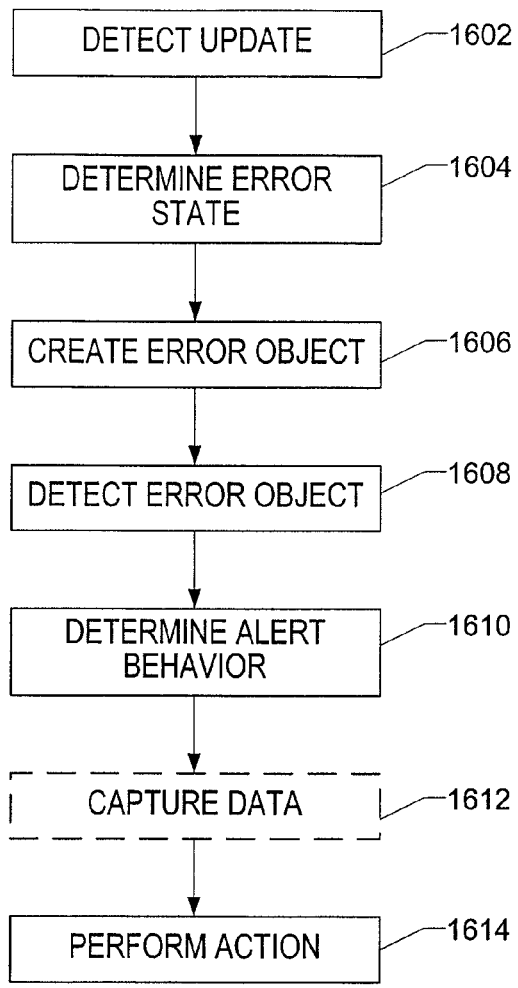
FIGS. 16 and 17 are flow charts that illustrate exemplary methods of using the system.

Turning to FIG. 16, once sensors, condition logic, alert profiles, profile sequences, alert actions, and capture definitions are configured, the system may operate to post changes to data such as through a data journal and take action in response. For example, the monitoring subsystem may detect an update to a sensor value as posted in the data management system, as shown at step 1602. The policy or condition may determine an error state in response to the sensor value update, as shown at step 1604. If an error state exists, an error object or alert may be created or a state of the error object may be changed, as shown at step 1606. For example, a threshold may be violated and an error object created and registered with the data management system. The error object may include, for example, an error status, an error start time, error level, and other associated data.

The alert handling subsystem may detect the error object, as shown at step 1608. The alert handling subsystem may access an alert profile and associated alert sequences to determine an alert action, as shown at step 1610. For example, the alert profile may include a continuous sequence element that provides for sending an SNMP trap and playing an audio message. Alternate embodiments of alert actions may include captured data. For example, FTP alert actions may transfer image data. As a result, the system may optionally capture data, as shown at step 1612. If captured data is desired, the alert action may delay performance until the data is available. For example, the capture management system may capture and store data and notify the alert action of data availability. The action may be performed, as shown at step 1614.

Errors and alerts are often responsive to changes in sensor values. In alternate embodiments, alert profiles and the alert handling system may act on changes to sensor values in the data management system. For example, door alarms, motion detectors and other anti-theft alarms may be bi-state sensors (on/off, true/false). The alert profiles may be configured to act based on a change in state, such as a door opening or a lost connection.

Figure 17:
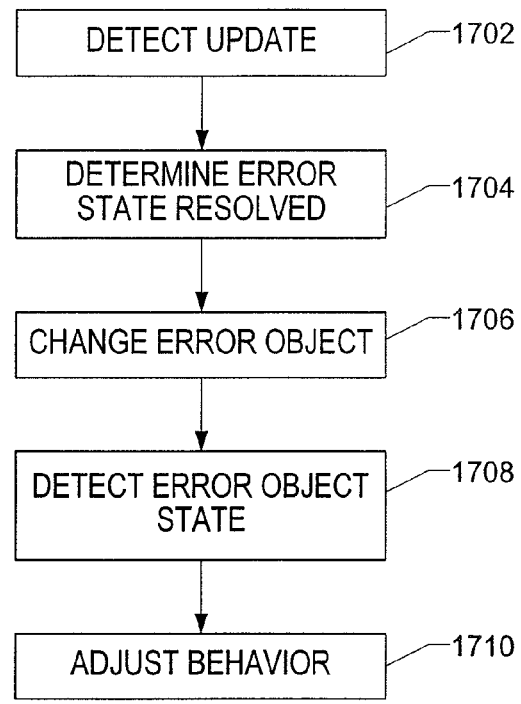

Generally, errors may be resolved. For example, a temperature threshold violation may be resolved once air conditioning is restored. As shown in FIG. 17, the monitoring system may detect an update, as shown at step 1702. The monitoring system may determine that the error has been resolved, as shown at step 1704, such as the temperature no longer violating a threshold. The monitoring system may change the state of the error object to "resolved," as shown at step 1706. The alert handling system may detect the error object state, as shown at step 1708, and adjust the behavior, as shown at step 1710. For example, the system may send an error resolved notification and cease further action. A similar method may be used to change the severity level of the error object. For example, the error object may have one severity level while the sensor value is below a first threshold, another level when the sensor value violates the first threshold but remains below a second threshold, and a further level when the sensor value violated the second threshold. Severity may also be determined via advanced policies utilizing more than one sensor input and comprising conditional terms.

Figure 18:
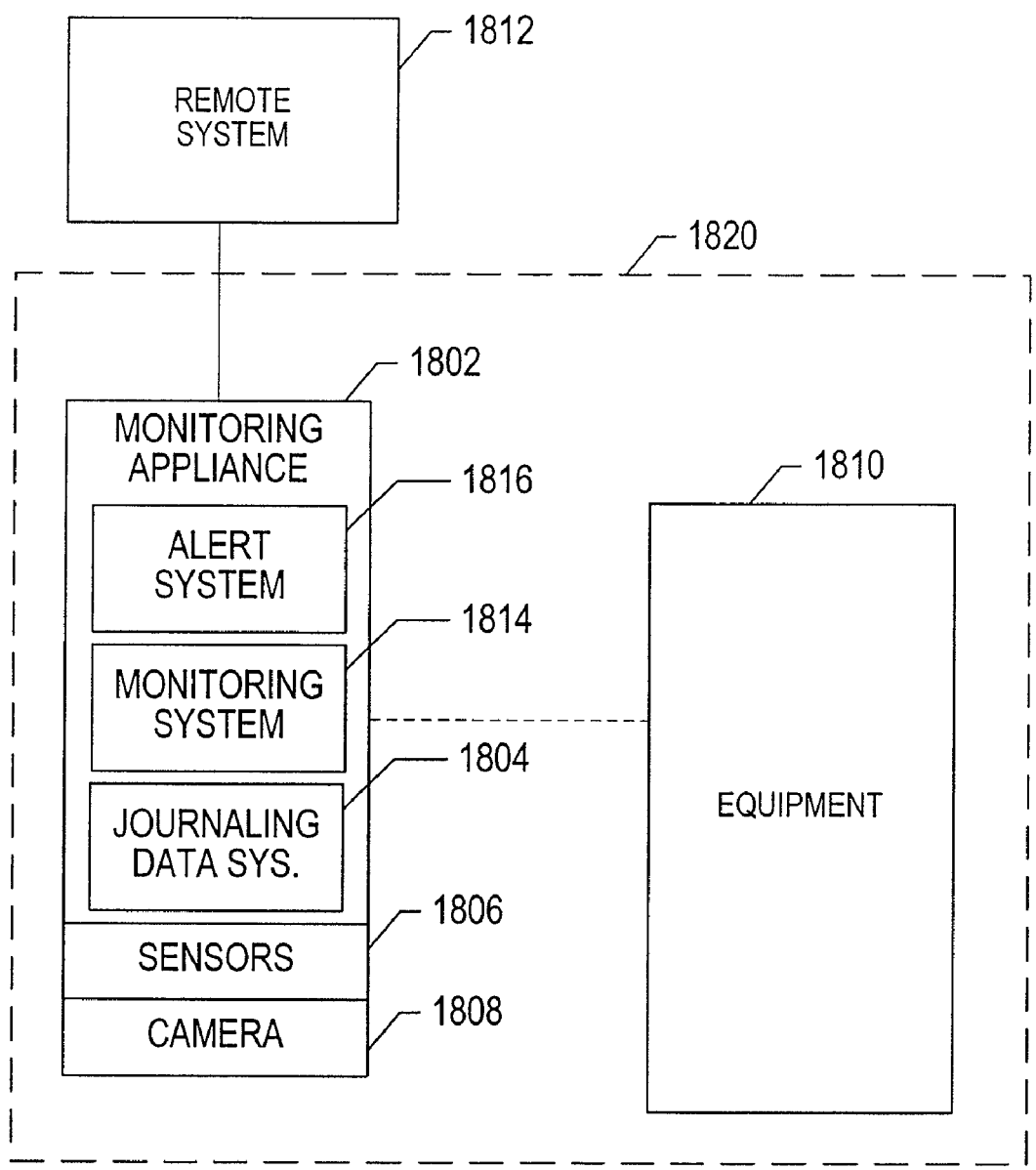
FIG. 18 is a block diagram that depicts an exemplary embodiment of a monitoring appliance.

FIG. 18 depicts an exemplary embodiment of a monitoring appliance 1802. The monitoring appliance 1802 may include interfaces to sensors 1806 and cameras 1808 to monitor the space 1820 and environment about equipment 1810. Exemplary sensors 1806 may include temperature sensors, airflow sensors, microphones, humidity sensors, motion sensors, door sensors, and leak detection sensors. Cameras may be used to monitor activities within the space. In addition, cameras and microphones may be used to monitor external signals provided by equipment and alarm systems. In one exemplary embodiment, the monitoring appliance 1802 may also include a connection to equipment 1810 for monitoring equipment operations, such as through SNMP.

The monitoring appliance 1802 may also communicate with a remote system 1812, such as a telephonic system or interconnected network system. For example, the monitoring appliance 1802 may communicate with a remote system connected to a pager network or telephonic network. Alternately, the monitoring appliance 1802 may communicate with a server via a protocol such as HTTP, FTP, or SNMP.

In one particular embodiment, the monitoring appliance includes a journaling data system 1804, which may act as a data manager. A monitoring system 1814 may interact with data in the data system 1804 to detect error conditions. The monitoring system 1814 may create error objects. These error objects may be used by an alert system 1816 to determine and facilitate actions in response to the error object. The actions may include capturing additional data such as image data, audio data, data from other accessible appliances, and data from accessible sensors. In exemplary embodiments, sensors, cameras, and other appliances may be accessed via wired or wireless connections. In one exemplary embodiment, sensors and a camera may be integrated with the appliance.

In an exemplary embodiment, the monitoring appliance may function to detect a problem and, when the problem occurs (threshold violation, sensor failure, etc), capture a set of video-quality pictures (high framerate) while sending only a couple of those pictures using e-mail. The person notified via e-mail receives a smaller, more manageable e-mail that can be used to evaluate whether the details of the video should be reviewed. The video-quality pictures may be transferred using FTP or HTTP to a server for long-term storage.

In another exemplary embodiment, device may use multiple thresholds on a given sensor to allow distinction between minor/less severe events (i.e. temperature slightly exceeding norms) versus more severe events (i.e. temperature rising very quickly, or exceeding norms by a large margin). The device may use either severity on each threshold or use different alert profiles on each thresholds to control which actions are triggered in response.

In a further exemplary embodiment, the device may use schedules on different alert actions to allow the same profile to be used to notify different people (possibly using different mechanisms), based on work schedules (i.e. who is responsible for handling such problems at specific times of day/days of week). The device may use different sequences in a profile to allow "escalation" of an unresolved problem, by triggering more urgent notification mechanisms (i.e. pagers versus e-mail), notifying different persons (i.e. backup, management), and/or taking corrective action (i.e. turning off power, turning on backup cooling). In a further exemplary embodiment, the device may use schedules and multiple thresholds in order to allow different "acceptable" values or behaviors at different times of day/days of week.

In another exemplary embodiment, the device may have the ability to have any single threshold or error-generating function drive collection of video and/or audio from zero or more cameras simultaneously, allowing correlated data collection from multiple vantage points.

In an exemplary embodiment, the device may include support for (using multiple alert profiles) distinctive response for different types of sensors (environmental versus security versus network), including different notifications to different people.

In an exemplary embodiment, the device may include support for add-on actions for communicating notifications into 3rd party systems, such as trouble-ticketing systems, databases, and system and network management products.

In an exemplary embodiment, the device may include support for communications failover during alert notifications, such as activating a modem when attempts to use network communications fail, allowing notifications to be successfully delivered. In a further exemplary embodiment, the device may include support for alert actions that issue commands to output devices, including changing the states of switches (including power switches) or causing switches to change state for a defined period of time. In another exemplary embodiment, the device may include support for threshold types that require human interaction before a detected problem is reported as "resolved". In an exemplary embodiment, the device may include support for threshold types that would monitor and check the values of more than one sensor, possibly of different types, and generate error reports based on a combination of conditions on the monitored sensors. In another exemplary embodiment, the device may include support for delivery of alert data, including captures pictures/audio/etc to multiple locations for the sake of security and/or redundancy.

The above-disclosed subject matter is to be considered illustrative, and not restrictive, and the appended claims are intended to cover all such modifications, enhancements, and other embodiments, which fall within the true scope of the present invention. For example, the system and methods may be implemented in embedded systems such as monitoring appliances, as well as in PCs and servers systems. Thus, to the maximum extent allowed by law, the scope of the present invention is to be determined by the broadest permissible interpretation of the following claims and their equivalents, and shall not be restricted or limited by the detailed description including the APPENDIX.

APPENDIX

APPENDIX A

Sample Sensor Description in XML

```
<variable varid="nbHawkEnc_0_TEMP" guid=
"B029f51_nbHawkEnc_0_TEMP"
classpath="/nbSensor/nbNumSensor/nbTempSensor" val-transient="yes"
persistent="yes" readonly="no" constant="no" remote="no" globalid=
"no" nodelete="no">
    <double-val isnull="no">27.200000</double-val>
    <metadata slotid="nbSortPrio" isclassdef="yes">
        <i32-val isnull="no">10</i32-val>
        </metadata>
    <metadata slotid=nbUnitsID" isclassdef="yes">
        <varid-val isnull="no">nbUnits_DegC</varid-val>
    </metadata>
    <metadata slotid="nbSugThreshCls" isclassdef="yes">
        <varid-val isnull="no">nbPlcyCls_nbRangeThresh</varid-val>
        </metadata>
    <metadata slotid="nbMinVal" isclassdef="yes">
        <double-val isnull="no">-40.000000</double-val>
    </metadata>
    <metadata slotid="nbMaxVal" isclassdef="yes">
        <double-val isnull="no">50.000000</double-val>
    </metadata>
    <metadata slotid="nbValInc" isclassdef="no">
        <double-val isnull=no">0.100000</double-val>
    </metadata>
    <metadata slotid="nbPrintFmt" isclassdef="yes">
        <string-val isnull"no">%.1f</string-val>
    </metadata>
    <metadata slotid="nbHistoryTime" isclassdef="yes">
        <u32-val isnull="no">28800</u32-val>
    </metadata>
    <metadata slotid="nbSNMPEnterpriseOID" isclassdef="yes">
        <string-val isnull="no">1.3.6.1.4.1.5528.100.10.2.1</string-val>
    </metadata>
    <metadata slotid="nbAudioClipID" isclassdef="yes">
        <varid-val isnull="no">nbAudioClip_temperature</varid-val>
    </metadata>
    <metadata slotid="nbSimpleThreshDef" isclassdef="yes">
        <varid-list-val isnull="no">
            <varid-val isnull=
"no">nbSimpleThreshPlcyBlkDef_temp</varid-val>
        </varid-list-val>
    </metadata>
    <metadata slotid="nbSimpleThreshDefDone" isclassdef="no">
        <varid-list-val isnull="no">
            <varid-val isnull="no">
            nbSimpleThreshPlcyBlkDef_temp</varid-val>
        </varid-list-val>
    </metadata>
    <metadata slotid="nbLabel" isclassdef="yes>
        <nls-string-val raw="%{nbMsg|Temperature%}"
isnull="no">Temperature</nls-string-val>
    </metadata>
    <metadata slotid="nbEncID" isclassdef="no">
        <varid-val isnull="no">nbHawkEnc_0</varid-val>
    </metadata>
</variable>
```

APPENDIX B

Sample error condition object

```
<variable varid="nbErrorCond_4B1F45B1" guid=
"B029f51_nbErrorCond_4B1F45B1"
classpath="/nbErrorCond" readonly="no" constant="no" persistent=
"no" val-transient="yes" remote="no" globalid="no" nodelete="no">
    <struct-val isnull="no">
```

APPENDIX B-continued

Sample error condition object

```
        <struct-element fieldid="severity">
            <string-val isnull="no">fail</string-val>
        </struct-element>
        <struct-element fieldid="errortype">
            <varid-val isnull="no">nbErrorType_podunplugged</varid-val>
        </struct-element>
        <struct-element fieldid="enclosure">
            <varid-val isnull="no">nbHawkEnc_1</varid-val>
        </struct-element>
        <struct-element fieldid="starttime">
            <utc-msec-val isnull="no">1050120292428</utc-msec-val>
        </struct-element>
    </struct-val>
    <metadata slotid="nbDescription" isclassdef="no">
        <nls-string-list-val isnull="no">
            <nls-string-val raw="Pod 'Sensor Pod 0002659' is unplugged or has
malfunctioned." isnull="no">Pod 'Sensor Pod 0002659' is unplugged or
has malfunctioned.</nls-string-val>
        </nls-string-list-val>
    </metadata>
    <metadata slotid="nbErrorTypeID" isclassdef="no">
        <varid-val isnull="no">nbErrorType_podunplugged</varid-val>
    </metadata>
    <metadata slotid="nbErrorResolved" isclassdef="yes">
        <bool-val val="false" isnull="no" />
    </metadata>
    <metadata slotid="nbLabel" isclassdef="no">
        <nls-string-val raw="Sensor Pod 0002659 - unplugged" isnull="no">
Sensor Pod 0002659 - unplugged</nls-string-val>
    </metadata>
    <metadata slotid="nbEncID" isclassdef="no">
        <varid-val isnull="no">nbHawkEnc_1</varid-val>
    </metadata>
</variable>
```

APPENDIX C

XML grammar for custom policy blocks

```
<!-- Policy Manager schema, used for encoding custom
    policy classes. -->
<!-- Top level object defining a "composite class" (a macro
    class consisting of a network of other class instances).
    'class' is the ID of the defined class. 'label' is
    the NLS-encoded presentation string for the ID (same
    encoding as for 'raw' attributes of <nls-string> in
    nbData.dtd. -->
<!ELEMENT policy-composite-class ((policy-input-def|
    policy-input-set-def|policy-output-def|policy-parm-def|
    policy-block-def)*)>
<!ATTLIST policy-composite-class
    class CDATA #REQUIRED
    label CDATA #REQUIRED
    type (simple-thresh|multi-thresh|primitive|functional-sensor)
    "primitive">
<!-- Policy input definition of a class definition: 'id' is
    identifier of input, 'type' is signal type for input,
    'label' is NLS-encoded presentation string for input -->
<!ELEMENT policy-input-def EMPTY>
<!ATTLIST policy-input-def
    id CDATA #REQUIRED
    type (i32-val|i64-val|double-val|bool-val|string-val) #REQUIRED
    label CDATA #REQUIRED
    class-req CDATA #IMPLIED>
<!-- Policy input set definition of a class definition: 'id' is
    identifier of input set, 'type' is signal type for input set,
    'label' is NLS-encoded presentation string for input set,
    'min-cnt' is minimum number of signals required in set,
    'max-cnt' is maximum number of signals allowed in set. -->
<!ELEMENT policy-input-set-def EMPTY>
<!ATTLIST policy-input-set-def
    id CDATA #REQUIRED
    type (i32-val|i64-val|double-val|bool-val|string-val) #REQUIRED
    label CDATA #REQUIRED
```

APPENDIX C-continued

XML grammar for custom policy blocks

```
    min-cnt CDATA "0"
    max-cnt CDATA "10000">
<!-- Policy output definition of a class definition: 'id' is
    identifier of output, 'type' is signal type for output,
    'label' is NLS-encoded presentation string for output. Contains
    a signal reference, defining the source of the output signal. -->
<!ELEMENT policy-output-def (abs-signal-ref|rel-signal-ref|
    variable-signal-ref|input-signal-ref|input-set-signal-ref)>
<!ATTLIST policy-output-def
    id CDATA #REQUIRED
    type (i32-val|i64-val|double-val|bool-val|string-val) #REQUIRED
    label CDATA #REQUIRED>
<!-- Absolute signal reference - defines a reference to an output of
    a specific global policy block instance.
-->
<!ELEMENT abs-signal-ref EMPTY>
<!ATTLIST abs-signal-ref
    block-id CDATA #REQUIRED
    output-id CDATA #REQUIRED>
<!-- Relative output signal reference - defines a reference to an output of
    a relative policy block instance (one defined as part of the composite
    policy block class. -->
<!ELEMENT rel-signal-ref EMPTY>
<!ATTLIST rel-signal-ref
    block-id CDATA #REQUIRED
    output-id CDATA #REQUIRED>
<!-- Variable signal reference - defines a reference to an nbVariable
    as a signal. -->
<!ELEMENT variable-signal-ref EMPTY>
<!ATTLIST variable-signal-ref
    var-id CDATA #REQUIRED>
<!-- Relative input signal reference - defines a reference to an input of
    the composite policy block class. -->
<!ELEMENT input-signal-ref EMPTY>
<!ATTLIST input-signal-ref
    input-id CDATA #REQUIRED>
<!-- Relative input set signal reference - defines a reference to a signal
    in an input set of the composite policy block class. -->
<!ELEMENT input-set-signal-ref EMPTY>
<!ATTLIST input-set-signal-ref
    input-set-id CDATA #REQUIRED
    input-set-index CDATA #REQUIRED>
<!-- Parameter definition for a parameter of a composite class. 'id' is
    ID of the parameter, 'label' is the NLS-encoded label,
    'advanced' controls if the parameter is an advanced setting.
    'range-from-input' is used to indicate that the units (nbUnits),
    min-val (nbMinVal), max-val (nbMaxVal), and val-inc (nbValInc)
    associated with the parameter value are provided by the
    nbVariable tied to the given input. 'min-from-parm' is used to
    indicate that the minimum value for the parameter is based on
    the current value of the parameter with the provided ID.
    'max-from-parm' is used to indicate that the maximum value for
    the parameter is based on the current value of the parameter
    with the provided ID.
    'units' is used to provide the var-id of the nbUnits object
    describing the units of the parameter
    -->
<!ELEMENT policy-parm-def (i32-parm-def|i64-parm-def|bool-parm-def|
    string-parm-def|double-parm-def)>
<!ATTLIST policy-parm-def
    id CDATA #REQUIRED
    label CDATA #REQUIRED
    advanced (yes|no) "no"
    range-from-input CDATA #IMPLIED
    min-from-parm CDATA #IMPLIED
    max-from-parm CDATA #IMPLIED
    units CDATA #IMPLIED>
<!-- Parameter definition for an int32-type parameter. 'default' is
    default value of the parameter, 'min-val' and 'max-val' are optional
    range restrictions on the parameter. 'val-inc' is an optional restriction
    on the interval between valid values. Value can include a list of
    <enum-label>records if it is an enumeration. -->
<!ELEMENT i32-parm-def (enum-label*)>
<!ATTLIST i32-parm-def
    default CDATA #IMPLIED
    subtype CDATA #IMPLIED
    min-val CDATA #IMPLIED
    max-val CDATA #IMPLIED
    val-inc CDATA #IMPLIED>
<!-- Label element for one label of an enumeration: 'label' is the NLS-
    encoded label. -->
<!ELEMENT enum-label EMPTY>
<!ATTLIST enum-label
    label CDATA #REQUIRED>
<!-- Parameter definition for an int64-type parameter. 'default' is
    default value of the parameter, 'min-val' and 'max-val' are optional
    range restrictions on the parameter. 'val-inc' is an optional restriction
    on the interval between valid values. -->
<!ELEMENT i64-parm-def EMPTY>
<!ATTLIST i64-parm-def
    default CDATA #IMPLIED
    subtype CDATA #IMPLIED
    min-val CDATA #IMPLIED
    max-val CDATA #IMPLIED
    val-inc CDATA #IMPLIED>
<!-- Parameter definition for a boolean-type parameter. 'default' is
    default value of the parameter. -->
<!ELEMENT bool-parm-def EMPTY>
<!ATTLIST bool-parm-def
    default (true|false) "false"
    subtype CDATA #IMPLIED>
<!-- Parameter definition for a string-type parameter. 'default' is
    default value of the parameter. -->
<!ELEMENT string-parm-def EMPTY>
<!ATTLIST string-parm-def
    default CDATA ""
    subtype CDATA #IMPLIED>
<!-- Parameter definition for a double-type parameter. 'default' is
    default value of the parameter, 'min-val' and 'max-val' are optional
    range restrictions on the parameter. 'val-inc' is an optional restriction
    on the interval between valid values. -->
<!ELEMENT double-parm-def EMPTY>
<!ATTLIST double-parm-def
    default CDATA #IMPLIED
    subtype CDATA #IMPLIED
    min-val CDATA #IMPLIED
    max-val CDATA #IMPLIED
    val-inc CDATA #IMPLIED>
<!-- Definition for a policy block instance defined within the composite
    policy block class. 'class' is the ID of the class used for the instance.
    -->
<!ELEMENT policy-block-def ((policy-block-parm-def|policy-block-
    input-def|policy-block-input-set-def|policy-block-input-set-bus-
    def)*)>
<!ATTLIST policy-block-def
    id CDATA #REQUIRED
    class CDATA #REQUIRED>
<!-- Policy block parameter definition - contains value of parameter
    'value' can include ${parm-id} for substitutions from value of
    corresponding composite block parameters -->
<!ELEMENT policy-block-parm-def EMPTY>
<!ATTLIST policy-block-parm-def
    id CDATA #REQUIRED
    type (i32-val|i64-val|double-val|bool-val|string-val) #REQUIRED
    value CDATA #REQUIRED>
<!-- Block input definition - defines signal reference for input -->
<!ELEMENT policy-block-input-def (abs-signal-ref|rel-signal-ref|
    variable-signal-ref|input-signal-ref|input-set-signal-ret)>
<!ATTLIST policy-block-input-def
    id CDATA #REQUIRED>
<!-- Block input set definition - defines signal references for input set -->
<!ELEMENT policy-block-input-set-def ((abs-signal-ref|rel-signal-ref|
    variable-signal-ref|input-signal-ref|input-set-signal-ref)*)>
<!ATTLIST policy-block-input-set-def
    id CDATA #REQUIRED>
<!-- Block input set bus definition - defines link to input set for
    composite policy block class to link to input set of block. -->
<!ELEMENT policy-block-input-set-bus-def EMPTY>
<!ATTLIST policy-block-input-set-bus-def
    id CDATA #REQUIRED
    input-set-id CDATA #REQUIRED>
```

Appendix D: Sample XML-encoded Policy Class Definition

```
<?xml version="1.0" ?>

<!DOCTYPE policy-composite-class SYSTEM "nbPolicy.dtd" >

<!--

Class name for MinMaxTimeThresh class

This class implements an extension of the basic min-max threshold, adding in a parameter for determining the
``` minimum time that a threshold needs to exceed the bounds.

```
++MinMaxTimeThresh++++++++++++++++++++++++++++++++
+                                                                           +
+        ++minmaxthr++++    ++mintime1++++++                  +
+        +        toohigh++++input    output+++++toohigh++
++input+++input        +   + min_time=      +  |             +
+        +             +   + '${min_time}'+  |               +
+        +             +   ++++++++++++++++  |               +
+        +       toolow++   ++++++++++++++++                 +
+        +             +|   |  ++norblock++++++              +
+        + min='${min}'+|   +++=inputs   output++normal++
+        + max='${max}'+|   ++/+             +               +
+        ++++++++++++++|   |   ++++++++++++++++              +
+                             |   ++++++++++++++++           +
+                             |                   |          +
+                             |  ++mintime2++++++ |          +
+                             +++input    output++++++toolow++
+                                + min_time=      +          +
+                                + '${min_time}'+            +
+                                ++++++++++++++++            +
++++++++++++++++++++++++++++++++++++++++++++++++++
```

-->

```xml
<policy-composite-class class="MinMaxTimeThresh"
    label="Min/Max threshold with min time">

<!-- Define an input for the value -->

<policy-input-def id="input" type="double-val"
       label="Input"/>

<!-- Define a 'too high' output -->

<policy-output-def id="toohigh" type="bool-val"
       label="Value too high">

<rel-signal-ref block-id="mintime1" output-id="output"/>

</policy-output-def>

<!-- Define a 'too low' output -->

<policy-output-def id="toolow" type="bool-val"
       label="Value too low">

<rel-signal-ref block-id="mintime2" output-id="output"/>

</policy-output-def>

<!-- Define a 'normal' output -->

<policy-output-def id="normal" type="bool-val"
       label="Value in range">

<rel-signal-ref block-id="norblock" output-id="boutput"/>

</policy-output-def>

<!-- Define the 'min' parameter -->
```

```
<policy-parm-def id="min" label="Minimum Value" advanced="no">

<double-parm-def default="0.0"/>

</policy-parm-def>

<!-- Define the 'max' parameter -->

<policy-parm-def id="max" label="Maximum Value" advanced="no">

<double-parm-def default="100.0"/>

</policy-parm-def>

<!-- Define the 'min_time' parameter -->

<policy-parm-def id="min_time" label="Minimum time for error" advanced="no">

<double-parm-def default="10.0"/>

</policy-parm-def>

<!-- Create an embedded block based on the MinMaxThreshFloat class -->

<policy-block-def id="minmaxthr" class="MinMaxThreshFloat">

<!-- Tie the input to the block input -->

<policy-block-input-def id="input">

<input-signal-ref input-id="input"/>

</policy-block-input-def>

<!-- Tie the min parm to the block min parm -->

<policy-block-parm-def id="min" type="double-val"

value="${min}"/>

<!-- Tie the max parm to the block max parm -->
```

```xml
        <policy-block-parm-def id="max" type="double-val"
            value="${max}"/>
    </policy-block-def>
    <!-- Create first mintime block for toohigh -->
    <policy-block-def id="mintime1" class="MinTimeBool">
        <!-- Input from toohigh signal -->
        <policy-block-input-def id="input">
            <rel-signal-ref block-id="minmaxthr" output-id="toohigh"/>
        </policy-block-input-def>
        <!-- Get min_time parm from block -->
        <policy-block-parm-def id="min_time" type="double-val"
            value="${min_time}"/>
    </policy-block-def>
    <!-- Create second mintime block for toolow -->
    <policy-block-def id="mintime2" class="MinTimeBool">
        <!-- Input from toolow signal -->
        <policy-block-input-def id="input">
            <rel-signal-ref block-id="minmaxthr" output-id="toolow"/>
        </policy-block-input-def>
        <!-- Get min_time parm from block -->
        <policy-block-parm-def id="min_time" type="double-val"
```

```xml
            value="${min_time}"/>

</policy-block-def>

<!-- Create the NOR block for the normal output -->

<policy-block-def id="norblock" class="NORBool">

<policy-block-input-set-def id="blkinputs">

<!-- Get one input from 'output' on 'mintime1' -->

<rel-signal-ref block-id="mintime1" output-id="output"/>

<!-- Get one input from 'output' on 'mintime2' -->

<rel-signal-ref block-id="mintime2" output-id="output"/>

</policy-block-input-set-def>

</policy-block-def>

</policy-composite-class>
```

Appendix E: Sample Alert Profile in XML

```xml
    <variable varid="nbAlertProfile_default" class="nbAlertProfile" persistent="yes" nodelete="yes">

<struct-val>

<struct-element fieldid="disableuntil">

<utc-val>0</utc-val>

</struct-element>

<!-- Schedule 0 - first alert level (start 0, repeat 300, end 600) -->

<struct-element fieldid="sched_0">
```

```xml
<struct-val>
  <struct-element fieldid="label">
    <!-- gettext("First Alert Level") -->
    <nls-string-val raw="%{|First Alert Level%}"/>
  </struct-element>
<struct-element fieldid="Tstart">
 <u32-val>0</u32-val>
  </struct-element>
  <struct-element fieldid="Nrepeats">
 <u32-val>2</u32-val>
  </struct-element>
  <struct-element fieldid="Tperiod">
   <u32-val>300</u32-val>
  </struct-element>
  <struct-element fieldid="enab_sched">
   <string-val>0 0 0 0 0 0 0</string-val>
  </struct-element>
  <struct-element fieldid="actlist">
   <varid-list-val>
    <varid-val>nbAlertAct_nbSendEmail_primary</varid-val>
      <varid-val>nbAlertAct_nbSendSMSEmail</varid-val>
      <varid-val>nbAlertAct_nbSendHTTP_default</varid-val>
```

```xml
    <varid-val>nbAlertAct_nbSendFTP_default</varid-val>

</varid-list-val>

</struct-element>

<struct-element fieldid="isdefault">

<bool-val val="true"/>

</struct-element>

</struct-val>

</struct-element>

<!-- Schedule 1 - second alert level (start 1200, repeat 600,
end 600) -->

<struct-element fieldid="sched_1">

<struct-val>

<struct-element fieldid="label">

<!-- gettext("Second Alert Level") -->

<nls-string-val raw="%{|Second Alert Level%}"/>

</struct-element>

<struct-element fieldid="Tstart">

<u32-val>1200</u32-val>

</struct-element>

<struct-element fieldid="Nrepeats">

<u32-val>1</u32-val>

</struct-element>

<struct-element fieldid="Tperiod">
```

```xml
      <u32-val>600</u32-val>

</struct-element>

<struct-element fieldid="enab_sched">

<string-val>0 0 0 0 0 0 0</string-val>

</struct-element>

<struct-element fieldid="actlist">

<varid-list-val>

<varid-val>nbAlertAct_nbSendEmail_secondary</varid-val>

<varid-val>nbAlertAct_nbSendSMSEmail</varid-val>

<varid-val>nbAlertAct_nbSendHTTP_default</varid-val>

<varid-val>nbAlertAct_nbSendFTP_default</varid-val>

</varid-list-val>

</struct-element>

<struct-element fieldid="isdefault">

<bool-val val="true"/>

</struct-element>

</struct-val>

</struct-element>

<!-- Schedule 2 - third alert level (start 5400, repeat 3600, end 10800) -->

<struct-element fieldid="sched_2">

<struct-val>

<struct-element fieldid="label">
```

```xml
<!-- gettext("Third Alert Level") -->

<nls-string-val raw="%{|Third Alert Level%}"/>

</struct-element>

<struct-element fieldid="Tstart">

<u32-val>5400</u32-val>

</struct-element>

<struct-element fieldid="Nrepeats">

<u32-val>2</u32-val>

</struct-element>

<struct-element fieldid="Tperiod">

<u32-val>3600</u32-val>

</struct-element>

<struct-element fieldid="enab_sched">

<string-val>0 0 0 0 0 0 0</string-val>

</struct-element>

<struct-element fieldid="actlist">

<varid-list-val>

<varid-val>nbAlertAct_nbSendEmail_primary</varid-val>

<varid-val>nbAlertAct_nbSendEmail_secondary</varid-val>

<varid-val>nbAlertAct_nbSendSMSEmail</varid-val>

<varid-val>nbAlertAct_nbSendHTTP_default</varid-val>

<varid-val>nbAlertAct_nbSendFTP_default</varid-val>
```

```xml
        </varid-list-val>

</struct-element>

<struct-element fieldid="isdefault">

<bool-val val="true"/>

</struct-element>

</struct-val>

</struct-element>

<!-- Schedule 3 - base periodic level (start 0, repeat 60, end 4000000000) -->

<struct-element fieldid="sched_3">

<struct-val>

<struct-element fieldid="label">

<!-- gettext("Continuous Alert") -->

<nls-string-val raw="%{|Continuous Alert%}"/>

</struct-element>

<struct-element fieldid="Tstart">

<u32-val>0</u32-val>

</struct-element>

<struct-element fieldid="Nrepeats">

<u32-val>1000000</u32-val>

</struct-element>

<struct-element fieldid="Tperiod">

<u32-val>60</u32-val>
```

```xml
        </struct-element>

<struct-element fieldid="enab_sched">

<string-val>0 0 0 0 0 0 0</string-val>

</struct-element>

<struct-element fieldid="actlist">

<varid-list-val>

<varid-val>nbAlertAct_nbSendSNMPTrap</varid-val>

<varid-val>nbAlertAct_nbPlayAudioAlert</varid-val>

</varid-list-val>

</struct-element>

<struct-element fieldid="isdefault">

<bool-val val="false"/>

</struct-element>

</struct-val>

</struct-element>

</struct-val>

<metadata slotid="nbLabel">

<nls-string-val raw="%{|Default%}"/>

</metadata>

</variable>
```

Appendix F: Sample Alert Action Handler Registration

```xml
    <!-- Send e-mail action class -->
```

```xml
<variable varid="nbAlertActCls_nbSendEmail"
class="nbAlertActionClass">

<struct-val>

<!-- E-mail notification list -->

<struct-element fieldid="parm_0">

<struct-val>

<struct-element fieldid="id">

<string-val>notify</string-val>

</struct-element>

<struct-element fieldid="type">

<string-val>string</string-val>

</struct-element>

<struct-element fieldid="subtype">

<string-val>notifylist</string-val>

</struct-element>

<struct-element fieldid="advanced">

<bool-val val="false"/>

</struct-element>

<struct-element fieldid="default">

<string-val></string-val>

</struct-element>

<struct-element fieldid="label">
```

```xml
                    <!-- gettext("E-mail Addresses") -->
                    <nls-string-val raw="%{|E-mail Addresses"/>
                </struct-element>
            </struct-val>
        </struct-element>
        <struct-element fieldid="parm_1">
            <struct-val>
                <struct-element fieldid="id">
                    <string-val>incerrornotify</string-val>
                </struct-element>
                <struct-element fieldid="type">
                    <string-val>bool</string-val>
                </struct-element>
                <struct-element fieldid="advanced">
                    <bool-val val="false"/>
                </struct-element>
                <struct-element fieldid="default">
                    <bool-val val="true"/>
                </struct-element>
                <struct-element fieldid="label">
```

```xml
                              <!-- gettext("Include Threshold-specific Addresses") -->

<nls-string-val raw="%{|Include Threshold-specific Addresses"/>

</struct-element>

</struct-val>

</struct-element>

<struct-element fieldid="exec">

<string-val>/opt/netbotz/bin/nbSendEmailAlert</string-val>

</struct-element>

<struct-element fieldid="max_runs">

<u32-val>1</u32-val>

</struct-element>

<struct-element fieldid="canincpix">

<bool-val val="true"/>

</struct-element>

<struct-element fieldid="canincsnd">

<bool-val val="true"/>

</struct-element>

<struct-element fieldid="canincgraph">

<bool-val val="true"/>

</struct-element>

</struct-val>
```

```
        <metadata slotid="nbLabel">

<!-- gettext("Send E-mail") -->

<nls-string-val raw="%{|Send E-mail%}"/>

</metadata>

</variable>
```

Appendix G: Sample Alert Action Instance

```
        <!-- Default e-mail action "primary notification e-mail" -->

<variable varid="nbAlertAct_nbSendEmail_primary"
class="nbAlertAction" persistent="yes">

<struct-val>

<struct-element fieldid="class">

<varid-val>nbAlertActCls_nbSendEmail</varid-val>

</struct-element>

<struct-element fieldid="parm_0">

<struct-val>

<struct-element fieldid="id">

<string-val>notify</string-val>

</struct-element>

<struct-element fieldid="setting">

<string-val></string-val>

</struct-element>

</struct-val>
```

```xml
            </struct-element>

<struct-element fieldid="parm_1">

<struct-val>

<struct-element fieldid="id">

<string-val>incerrornotify</string-val>

</struct-element>

<struct-element fieldid="setting">

<bool-val val="true"/>

</struct-element>

</struct-val>

</struct-element>

<struct-element fieldid="sched">

<string-val>0 0 0 0 0 0 0</string-val>

</struct-element>

<struct-element fieldid="sevlist">

<string-list-val><!-- empty list = all severities-->

</string-list-val>

</struct-element>

<struct-element fieldid="errtypes">

<varid-list-val>

</varid-list-val>
```

```
        </struct-element>

<struct-element fieldid="incpix">

<u32-val>10</u32-val>

</struct-element>

<struct-element fieldid="incsnd">

<bool-val val="false"/>

</struct-element>

<struct-element fieldid="incgraph">

<bool-val val="true"/>

</struct-element>

</struct-val>

<metadata slotid="nbLabel">

<!-- gettext("Primary E-mail Notification") -->

<nls-string-val raw="%{|Primary E-mail Notification%}"/>

</metadata>

</variable>
```

What is claimed is:

1. A computer implemented method for monitoring a network sensor comprising:
   receiving sensor data associated with a sensor;
   creating, at least one instance of a composite block class associated with the sensor, the composite block class being implemented in a non-executable language and being configured to determine, using at least one logical network of primitive block classes, whether the sensor data indicates an error condition, each of the at least one logical network of primitive block classes including a compiled set of instructions executable by a processor;
   interpreting the at least one instance of the composite block class to determine, using the at least one logical network of primitive block classes, whether the sensor data indicates the error condition;
   creating, selectively based on the indication of the error condition, an error object; and
   storing the error condition in an error object on a computer readable medium.

2. The method according to claim 1, wherein storing the error condition comprises storing a severity indicator and an initial time.

3. The method according to claim 1, wherein interpreting the at least one instance of the composite block class comprises executing a time delay element configured to receive a series of input values and a time delay parameter and further configured to provide an output value, the output value being equal to one of the series of input values that was received at a time indicated by the time delay parameter.

4. The method according to claim 1, wherein interpreting the at least one instance of the composite block class comprises executing a hysteresis element configured to receive a series of input values and a repeat time parameter and further configured to provide an output value, the output value being equal to a repeating input value assumed by each of the series of input values for a time indicated by the repeat time parameter.

5. The method according to claim 1, wherein interpreting the at least one instance of the composite block class comprises executing a bounding element configured to receive an input value and a range parameter and further configured to provide an output value, the output value being equal to the input value when the input parameter falls within the range indicated by the range parameter.

6. The method according to claim 1, wherein interpreting the at least one instance of the composite block class comprises executing a minimum over time element configured to receive a series of input values and a time span parameter and further configured to provide an output value, the output value being equal to a minimum of the series of input values received during a time span indicated by the time span parameter.

7. The method according to claim 1, wherein interpreting the at least one instance of the composite block class comprises executing a maximum over time element configured to receive a series of input values and a time span parameter and further configured to provide an output value, the output value being equal to a maximum of the series of input values received during a time span indicated by the time span parameter.

8. The method according to claim 1, wherein interpreting the at least one instance of the composite block class comprises interpreting a minimum time threshold block configured to receive the sensor data, a minimum value parameter and a duration parameter and further configured to generate the error condition if the sensor data is below a value indicated by the minimum value parameter for a duration of time indicated by the duration parameter.

9. The method according to claim 1, wherein interpreting the at least one instance of the composite block class comprises interpreting a maximum time threshold block configured to receive the sensor data, a maximum value parameter and a duration parameter and further configured to generate the error condition if the sensor data is above a value indicated by the maximum value parameter for a duration of time indicated by the duration parameter.

10. The method according to claim 1, wherein interpreting the at least one instance of the composite block class comprises interpreting an increase rate threshold block configured to receive the sensor data, a maximum increase parameter and a duration parameter and further configured to generate the error condition if the sensor data increases by an amount indicated by the maximum increase parameter over a duration of time indicated by the duration parameter.

11. The method according to claim 1, wherein interpreting the at least one instance of the composite block class comprises interpreting an decrease rate threshold block configured to receive the sensor data, a maximum decrease parameter and a duration parameter and further configured to generate the error condition if the sensor data decreases by an amount indicated by the maximum decrease parameter over a duration of time indicated by the duration parameter.

12. A computer readable medium having stored thereon sequences of instructions including instructions that will cause a processor to:
    receiving sensor data associated with a sensor;
    creating, at least one instance of a composite block class associated with the sensor, the composite block class being implemented in a non-executable language and being configured to determine, using at least one logical network of primitive block classes, whether the sensor data indicates an error condition, each of the at least one logical network of primitive block classes including a compiled set of instructions executable by a processor;
    interpreting the at least one instance of the composite block class to determine, using the at least one logical network of primitive block classes, whether the sensor data indicates the error condition;
    creating, selectively based on the indication of the error condition, an error object; and
    storing the error condition in an error object on a computer readable medium.

13. A monitoring system comprising:
    a computer readable medium storing at least one composite block class associated with a sensor, the at least one composite block class being implemented in a non-executable language and being configured to determine, using at least one logical network of primitive block classes, whether sensor data associated with the sensor indicates an error condition, each of the at least one logical network of primitive block classes including a compiled set of instructions executable by a processor; and
    the processor coupled to the computer readable medium and configured to interpret the at least one composite block and to store, selectively based on the indication of the error condition, the error condition in an error object.

14. The monitoring system of claim 13, wherein the error object comprises a severity indicator and an initial time.

15. The monitoring system of claim 13, wherein the at least one logical network of primitive block classes comprises a time delay element configured to receive a series of input values and a time delay parameter and further configured to provide an output value, the output value being equal to one of the series of input values that was received at a time indicated by the time delay parameter.

16. The monitoring system of claim 13, wherein the at least one logical network of primitive block classes comprises a hysteresis element configured to receive a series of input values and a repeat time parameter and further configured to provide an output value, the output value being equal to a repeating input value assumed by each of the series of input values for a time indicated by the repeat time parameter.

17. The monitoring system of claim 13, wherein the at least one logical network of primitive block classes comprises a bounding element configured to receive an input value and a range parameter and further configured to provide an output value, the output value being equal to the input value when the input parameter falls within the range indicated by the range parameter.

18. The monitoring system of claim 13, wherein the at least one logical network of primitive block classes comprises a minimum over time element configured to receive a series input values and a time span parameter and further configured to provide an output value, the output value being equal to a minimum of the series of input values received during a time span indicated by the time span parameter.

19. The monitoring system of claim 13, wherein the at least one logical network of primitive block classes comprises a maximum over time element configured to receive a series input values and a time span parameter and further configured to provide an output value, the output value being equal to a maximum of the series of input values received during a time span indicated by the time span parameter.

20. The monitoring system of claim 13, wherein the at least one composite block class comprises a minimum time threshold block configured to receive the sensor data, a minimum value parameter and a duration parameter and further configured to generate the error condition if the sensor data is below a value indicated by the minimum value parameter for a duration of time indicated by the duration parameter.

21. The monitoring system of claim 13, wherein the at least one composite block class comprises a maximum time threshold block configured to receive the sensor data, a maximum value parameter and a duration parameter and further configured to generate the error condition if the sensor data is above a value indicated by the maximum value parameter for a duration of time indicated by the duration parameter.

22. The monitoring system of claim 13, wherein the at least one composite block class comprises an increase rate threshold block configured to receive the sensor data, a maximum increase parameter and a duration parameter and further configured to generate the error condition if the sensor data increases by an amount indicated by the maximum increase parameter over a duration of time indicated by the duration parameter.

23. The monitoring system of claim 13, wherein the at least one composite block class comprises an decrease rate threshold block configured to receive the sensor data, a maximum decrease parameter and a duration parameter and further configured to generate the error condition if the sensor data decreases by an amount indicated by the maximum decrease parameter over a duration of time indicated by the duration parameter.

24. The monitoring system of claim 13 further comprising an interface coupled to the processor and configured to receive the sensor data associated with a sensor.

25. The monitoring system of claim 13, further comprising an interface configured to receive configuration data describing at least one other composite block class and to create the at least one other composite block class using the configuration data.

26. A method for creating monitoring logic comprising:
providing, to a user in a display of a computer system, a plurality of primitive block classes, each of the plurality of primitive block classes including a complied set of instructions executable by a processor and configured to process input sensor data into an output;
receiving, from the user of the computer system, configuration data defining a composite block class using at least one of the plurality of primitive block classes; and
storing the composite block class on a computer readable medium.

27. The method according to claim 26, wherein receiving, from the user of the computer system, the configuration data comprises receiving configuration data defining a composite block class that includes another composite block class.

* * * * *